United States Patent
Sun et al.

(10) Patent No.: US 9,723,518 B2
(45) Date of Patent: Aug. 1, 2017

(54) NETWORK OFFLOAD METHOD AND APPARATUS

(71) Applicant: Huawei Technologies Co., Ltd., Shenzhen, Guangdong (CN)

(72) Inventors: Jie Sun, Chengdu (CN); Xingxin Zhang, Chengdu (CN); Xuehuan Wang, Chengdu (CN); Jianjun Yang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/056,672

(22) Filed: Feb. 29, 2016

(65) Prior Publication Data

US 2016/0183125 A1 Jun. 23, 2016

Related U.S. Application Data

(63) Continuation of application No. PCT/CN2014/075071, filed on Apr. 10, 2014.

(30) Foreign Application Priority Data

Aug. 30, 2013 (CN) .......................... 2013 1 0388994

(51) Int. Cl.
*H04W 28/08* (2009.01)
*H04W 36/14* (2009.01)
*H04W 36/22* (2009.01)

(52) U.S. Cl.
CPC ........... *H04W 28/08* (2013.01); *H04W 36/14* (2013.01); *H04W 36/22* (2013.01)

(58) Field of Classification Search
None
See application file for complete search history.

(56) References Cited

U.S. PATENT DOCUMENTS 6,871,075 B2 * 3/2005 Hwang ................... H04L 47/10
370/402
2005/0221839 A1 10/2005 Chan et al.
(Continued)

FOREIGN PATENT DOCUMENTS

CN 101626596 B 8/2011
CN 102440045 A 5/2012
(Continued)

OTHER PUBLICATIONS

"Part 11: Wireless LAN Medium Access Control (MAC) and Physical Layer (PHY) Specifications", IEEE Standards Association, IEEE Std 802.11, Mar. 29, 2012, 2793 pages.

*Primary Examiner* — Daniel Lai

(57) ABSTRACT

Embodiments of the present invention provide a network offload method and apparatus, where the method includes: receiving, by a first network controller, network state information of a terminal, where there is at least one terminal, the network state information is state information of the terminal on at least one corresponding access network, and the first network controller is a network controller of a first access network; generating, by the first network controller, an offload policy for the terminal according to the network state information; and sending, by the first network controller, the offload policy to the terminal; and/or sending the offload policy to an access device of the at least one access network, so that a network-side device or the terminal performs offload according to the offload policy and the network side can implement control on terminal offloading.

10 Claims, 12 Drawing Sheets

(56) References Cited

U.S. PATENT DOCUMENTS

| | | | | |
|---|---|---|---|---|
| 2006/0035644 A1* | 2/2006 | Niwano | ............... | H04W 36/16 |
| | | | | 455/450 |
| 2012/0176994 A1 | 7/2012 | Huang et al. | | |
| 2013/0070594 A1* | 3/2013 | Garcia Martin | ...... | H04W 28/08 |
| | | | | 370/235 |
| 2014/0064072 A1* | 3/2014 | Ludwig | ............... | H04L 47/2483 |
| | | | | 370/230 |
| 2015/0139184 A1* | 5/2015 | Wang | ................... | H04W 28/08 |
| | | | | 370/331 |

FOREIGN PATENT DOCUMENTS

| | | |
|---|---|---|
| CN | 102665248 A | 9/2012 |
| CN | 102695291 A | 9/2012 |
| CN | 102711184 A | 10/2012 |
| CN | 103491578 A | 1/2014 |
| WO | WO 2012/149954 A1 | 11/2012 |
| WO | WO 2013/091485 A1 | 6/2013 |

* cited by examiner

NETWORK OFFLOAD METHOD AND APPARATUS

CROSS-REFERENCE TO RELATED APPLICATIONS

This application is a continuation of International Application No. PCT/CN2014/075071, filed on Apr. 10, 2014, which claims priority to Chinese Patent Application No. 201310388994.4, filed on Aug. 30, 2013, both of which are hereby incorporated by reference in their entireties.

TECHNICAL FIELD

The present invention relates to wireless communications technologies, and in particular, to a network offload method and apparatus.

BACKGROUND

In recent years, with the continuous increase of Internet access requirements for intelligent terminals, a cellular network can hardly satisfy bandwidth resources required by various services. With the increase of accordingly emerging multi-mode terminals, such as dual-mode terminals that support a cellular network and a wireless local area network (Wireless Local Area Network, WLAN), using a WLAN to offload traffic on a cellular network becomes a trend in the industry.

Offload (offload) refers to smoothly migrating a mobile data service from one network to another network. In order to use a WLAN to perform offload for a cellular network, the $3^{rd}$ Generation Partnership Project (3rd Generation Partnership Project, 3GPP) puts forward an access network discovery and selection function (Access Network Discovery and Selection Function, ANDSF) to assist a terminal in selecting an access network. Specifically, the ANDSF server and the terminal both support the Open Mobile Alliance (Open Mobile Alliance, OMA) Device Management (Device Management, DM) protocol. An ANDSF server and a terminal that are located on a core network of a cellular network communicate by using the S14 interface, so that the terminal obtains a network selection policy. For example, the terminal uses a push (push) manner, that is, it passively receives a network selection policy sent by the ANDSF server, or uses a pull (pull) manner, that is, the terminal proactively queries the ANDSF about the network selection policy. Then, according to the obtained network selection policy, the terminal discovers and selects the access network on its own.

In addition, using a WLAN to perform offload for a cellular network may also be implemented by using related mechanisms defined by the Institute of Electrical and Electronics Engineers (Institute of Electrical and Electronics Engineers, IEEE). Specifically, the terminal acquires related information of a WLAN, a 3G network, and the like. For example, the terminal proactively sends a probe request (Probe Request) frame to an access device of the WLAN; or passively receives a beacon (Beacon) sent by an access device of the WLAN so as to obtain related information of the WLAN. Then, according to the obtained network information, the terminal discovers and selects the access network on its own.

However, in both the foregoing offload methods, the terminal discovers and selects the access network on its own, so that a network side can hardly accomplish a full control of the offload action of the terminal.

SUMMARY

Embodiments of the present invention provide a network offload method and apparatus so that a network side can implement control on terminal offloading.

According to a first aspect, an embodiment of the present invention provides a network offload method, including:

receiving, by a first network controller, network state information of a terminal, where there is at least one terminal, the network state information is state information of the terminal on at least one corresponding access network, and the first network controller is a network controller of a first access network;

generating, by the first network controller, an offload policy for the terminal according to the network state information; and sending, by the first network controller, the offload policy to the terminal; and/or sending the offload policy to an access device of the at least one access network.

Further, the receiving, by a first network controller, network state information of a terminal includes:

receiving, by the first network controller, first network state information of the terminal on the first access network, where the first network state information is sent by the terminal and/or a first access device of the first access network to the first network controller; and the generating, by the first network controller, an offload policy for the terminal according to the network state information includes:

generating, by the first network controller, the offload policy for the terminal according to the first network state information.

Further, the receiving, by a first network controller, network state information of a terminal includes:

receiving, by the first network controller, first network state information of the terminal on the first access network, where the first network state information is sent by the terminal and/or a first access device of the first access network to the first network controller; and receiving, by the first network controller, a second allocation list sent by a second network controller of a second access network, where the second allocation list indicates a correspondence between each terminal and a second access device of the second access network, the second allocation list is obtained by the second network controller according to received second network state information of the terminal on the second access network, and the second network state information is sent by the terminal and/or the second access device of the second access network to the second network controller; and the generating, by the first network controller, an offload policy for the terminal according to the network state information includes:

generating, by the first network controller, the offload policy for the terminal according to the first network state information and the second allocation list.

Further, after the receiving, by the first network controller, first network state information of the terminal on the first access network, the method includes:

generating, by the first network controller, a first allocation list according to the first network state information, where the first allocation list indicates a correspondence between each terminal and the first access device of the first access network; and the generating, by the first network controller, an offload policy for the terminal according to the network state information includes:

generating, by the first network controller, the offload policy for the terminal according to the first allocation list and the second allocation list.

Further, after the receiving, by a first network controller, network state information of a terminal, the method includes:

generating, by the first network controller, a first allocation list according to first network state information, where the first allocation list indicates a correspondence between each terminal and a first access device of the first access network; and sending, by the first network controller, first allocation list information to a second network controller of a second access network, where the first allocation list information includes at least identification information of each terminal in the first allocation list, so that the second network controller sends second network state information of each terminal in the first allocation list information to the first network controller according to the identification information of each terminal in the first allocation list information; and the generating, by the first network controller, an offload policy for the terminal according to the network state information includes:

generating, by the first network controller, the offload policy for each terminal in the first allocation list according to the second network state information of each terminal in the first allocation list.

Further, the first access network is a wireless local area network WLAN, and the first network controller is a WLAN controller.

Further, the first access network is a wireless local area network WLAN, the first network controller is a WLAN controller, the first access device is an access point AP, the second access network is a cellular network, the second network controller is a cellular network controller, and the second access device is a cellular access point; or the first access network is a cellular network, the first network controller is a cellular network controller, the first access device is a cellular access point, the second access network is a wireless local area network WLAN, the second network controller is a WLAN controller, and the second access device is an access point AP.

Further, the offload policy includes at least one type of the following information:

access network indication information, indicating information about an access network that each terminal should access;

access device indication information, indicating access device information of an access network that each terminal should access; and service indication information, indicating service information of each terminal and information about an access network that a service indicated by the service information should access.

Further, the receiving, by a first network controller, network state information of a terminal includes:

receiving, by the first network controller, network state information sent by the terminal; or receiving, by the first network controller, network state information sent by a first access device of the first access network and indicative of a state of the terminal on the first access network; or receiving, by the first network controller, network state information sent by a network controller of another access network than the first access network and indicative of a state of the terminal on the another access network than the first access network.

Further, the network state information sent by the terminal and received by the first network controller includes:

state information of the terminal on the first access network to which the first network controller belongs; and/or state information of the terminal on the another access network than the first access network.

According to a second aspect, an embodiment of the present invention provides a network offload method, including:

receiving and/or acquiring, by an offload decider, locally stored network state information of a terminal, where there is at least one terminal, and the network state information is state information of each terminal on at least one corresponding access network;

generating, by the offload decider, an offload policy for the terminal according to the network state information; and sending, by the offload decider, the offload policy to the terminal; and/or sending the offload policy to an access device of the at least one access network.

Further, the receiving, by the offload decider, the network state information of the terminal includes:

receiving, by the offload decider, network state information of the terminal that is sent by a network controller of each access network, where the network state information is sent by the terminal to the network controller of each access network and/or sent by an access device of each access network to a network controller corresponding to the access device; or receiving, by the offload decider, network state information sent by each terminal.

Further, the receiving, by the offload decider, network state information of the terminal that is sent by a network controller of each access network includes:

receiving, by the offload decider, first network state information sent by a first network controller of a first access network, and second network state information sent by a second network controller of a second access network; and the generating, by the offload decider, an offload policy for the terminal according to the network state information includes:

generating, by the offload decider, the offload policy for the terminal according to the first network state information and the second network state information.

Further, the receiving, by the offload decider, first network state information sent by a first network controller of a first access network includes:

receiving, by the offload decider, a first allocation list generated by the first network controller according to the first network state information, where the first allocation list indicates a correspondence between each terminal and a first access device of the first access network; and the generating, by the offload decider, the offload policy for the terminal according to the first network state information and the second network state information includes:

generating, by the offload decider, the offload policy for the terminal according to the first allocation list and the second network state information.

Further, the receiving, by the offload decider, second network state information sent by a second network controller of a second access network includes:

receiving, by the offload decider, a second allocation list generated by the second network controller according to the second network state information, where the second allocation list indicates a correspondence between each terminal and a second access device of the second access network; and the generating, by the offload decider, the offload policy for the terminal according to the first network state information and the second network state information includes:

generating, by the offload decider, the offload policy for the terminal according to the second allocation list and the first network state information.

Further, the receiving, by the offload decider, first network state information sent by a first network controller of a first access network, and second network state information sent by a second network controller of a second access network includes:

receiving, by the offload decider, a first allocation list generated by the first network controller according to the first network state information, and a second allocation list generated by the second network controller according to the second network state information, where the first allocation list indicates a correspondence between each terminal and a first access device of the first access network, and the second allocation list indicates a correspondence between each terminal and a second access device of the second access network; and the generating, by the offload decider, the offload policy for the terminal according to the first network state information and the second network state information includes:

generating, by the offload decider, the offload policy for the terminal according to the first allocation list and the second allocation list.

Further, the receiving, by the offload decider, network state information of the terminal that is sent by a network controller of each access network includes:

receiving, by the offload decider, first network state information sent by a first network controller of a first access network, and second network state information sent by a second network controller of a second access network according to a first coverage list of the first access network, where the first coverage list indicates a covered terminal that is covered by the first access network, and the second network state information is state information of the covered terminal on the second access network; and the generating, by the offload decider, an offload policy for the terminal according to the network state information includes:

generating the offload policy for the covered terminal according to the first network state information and the second network state information that is of the covered terminal.

Further, the receiving, by the offload decider, network state information of the terminal that is sent by a network controller of each access network includes:

receiving, by the offload decider, first network state information sent by a first network controller of a first access network according to a second allocation list of a second access network, and second network state information sent by a second network controller of the second access network, where the second allocation list indicates a correspondence between each terminal and a second access device of the second access network; and the generating, by the offload decider, an offload policy for the terminal according to the network state information includes:

generating, by the offload decider according to the first network state information of each terminal indicated by the second allocation list, and the second network state information, the offload policy for each terminal indicated by the second allocation list.

Further, the first access network is a wireless local area network WLAN, the first network controller is a WLAN controller, the first access device is an access point AP, the second access network is a cellular network, the second network controller is a cellular network controller, and the second access device is a cellular access point.

Further, the offload policy includes at least one type of the following information:

access network indication information, indicating information about an access network that each terminal should access;

access device indication information, indicating access device information of an access network that each terminal should access; and service indication information, indicating service information of each terminal and information about an access network that a service indicated by the service information should access.

According to a third aspect, an embodiment of the present invention provides a network offload method, including:

receiving, by a first network controller, first access device state information sent by a first access device of a first access network;

generating, by the first network controller, offload condition information of the first access device according to the first access device state information, where the offload condition information indicates a condition to be satisfied by a terminal allowed to access the first access device; and sending, by the first network controller, the offload condition information to the first access device, so that the first access device determines, according to the offload condition information, whether to allow a terminal to access.

According to a fourth aspect, an embodiment of the present invention provides a network offload apparatus, including:

a receiving module, configured to receive and/or acquire locally stored network state information of a terminal, where there is at least one terminal, the network state information is state information of the terminal on at least one corresponding access network, and the first network controller is a network controller of a first access network;

a processing module, configured to generate an offload policy for the terminal according to the network state information received by the receiving module; and a sending module, configured to send the offload policy generated by the processing module to the terminal; and/or send the offload policy generated by the processing module to an access device of the at least one access network.

Further, the receiving module is configured to receive first network state information of the terminal on the first access network, where the first network state information is sent by the terminal and/or a first access device of the first access network to the first network controller; and the processing module is configured to generate an offload policy for the terminal according to the first network state information received by the receiving module.

Further, the receiving module is configured to receive first network state information of the terminal on the first access network, where the first network state information is sent by the terminal and/or a first access device of the first access network to the first network controller; and a second allocation list sent by a second network controller of a second access network, where the second allocation list indicates a correspondence between each terminal and a second access device of the second access network, the second allocation list is obtained by the second network controller according to received second network state information of the terminal on the second access network, and the second network state information is sent by the terminal and/or the second access device of the second access network to the second network controller; and the processing module is configured to generate an offload policy for the terminal according to the first network state information and the second allocation list that are received by the receiving module.

Further, the processing module is further configured to generate a first allocation list according to the first network state information, where the first allocation list indicates a correspondence between each terminal and the first access device of the first access network; and generate the offload policy for the terminal according to the first allocation list and the second allocation list.

Further, the processing module is further configured to generate a first allocation list according to first network state information, where the first allocation list indicates a correspondence between each terminal and a first access device of the first access network; and the sending module is further configured to send first allocation list information to a second network controller of a second access network, where the first allocation list information includes at least identification information of each terminal in the first allocation list, so that the second network controller sends second network state information of each terminal in the first allocation list information to the first network controller according to the identification information of each terminal in the first allocation list information; and the processing module is configured to generate the offload policy for each terminal in the first allocation list according to the second network state information of each terminal in the first allocation list.

Further, the offload policy includes at least one type of the following information:

access network indication information, indicating information about an access network that each terminal should access;

access device indication information, indicating access device information of an access network that each terminal should access; and service indication information, indicating service information of each terminal and information about an access network that a service indicated by the service information should access.

Further, the receiving module is configured to:

receive network state information sent by the terminal; or receive network state information sent by a first access device of the first access network and indicative of a state of the terminal on the first access network; or receive network state information sent by a network controller of another access network than the first access network and indicative of a state of the terminal on the another access network than the first access network.

Further, the network state information sent by the terminal and received by the receiving module includes:

state information of the terminal on the first access network to which the first network controller belongs; and/or state information of the terminal on the another access network than the first access network.

According to a fifth aspect, an embodiment of the present invention provides a network offload apparatus, including:

a receiving module, configured to receive and/or acquire locally stored network state information of a terminal, where there is at least one terminal, and the network state information is state information of each terminal on at least one corresponding access network;

a processing module, configured to generate an offload policy for the terminal according to the network state information received by the receiving module; and a sending module, configured to send the offload policy generated by the processing module to the terminal; and/or send the offload policy generated by the processing module to an access device of the at least one access network.

Further, the receiving module is configured to receive network state information of the terminal that is sent by a network controller of each access network, where the network state information is sent by the terminal to the network controller of each access network and/or sent by an access device of each access network to a network controller corresponding to the access device; or receive network state information sent by each terminal.

Further, the receiving module is configured to receive first network state information sent by a first network controller of a first access network, and second network state information sent by a second network controller of a second access network; and the processing module is configured to generate the offload policy for the terminal according to the first network state information and the second network state information.

Further, the receiving module is configured to receive a first allocation list generated by the first network controller according to the first network state information, where the first allocation list indicates a correspondence between each terminal and a first access device of the first access network; and the processing module is configured to generate the offload policy for the terminal according to the first allocation list and the second network state information.

Further, the receiving module is configured to receive a second allocation list generated by the second network controller according to the second network state information, where the second allocation list indicates a correspondence between each terminal and a second access device of the second access network; and the processing module is configured to generate the offload policy for the terminal according to the second allocation list and the first network state information that are received by the receiving module.

Further, the receiving module is configured to receive a first allocation list generated by the first network controller according to the first network state information, and a second allocation list generated by the second network controller according to the second network state information, where the first allocation list indicates a correspondence between each terminal and a first access device of the first access network, and the second allocation list indicates a correspondence between each terminal and a second access device of the second access network; and the processing module is configured to generate the offload policy for the terminal according to the first allocation list and the second allocation list.

Further, the receiving module is configured to receive first network state information sent by a first network controller of a first access network, and second network state information sent by a second network controller of a second access network according to a first coverage list of the first access network, where the first coverage list indicates a covered terminal that is covered by the first access network, and the second network state information is state information of the covered terminal on the second access network; and the processing module is configured to generate the offload policy for the covered terminal according to the first network state information and the second network state information that is of the covered terminal.

Further, the receiving module is configured to receive first network state information sent by a first network controller of a first access network according to a second allocation list of a second access network, and second network state information sent by a second network controller of the second access network, where the second allocation list indicates a correspondence between each terminal and a second access device of the second access network; and the processing module is configured to generate, according to the first network state information of each terminal indicated by the second allocation list, and the second network state information, the offload policy for each terminal indicated by the second allocation list.

Further, the first access network is a wireless local area network WLAN, the first network controller is a WLAN controller, the first access device is an access point AP, the second access network is a cellular network, the second network controller is a cellular network controller, and the second access device is a cellular access point.

Further, the offload policy includes at least one type of the following information:

access network indication information, indicating information about an access network that each terminal should access;

access device indication information, indicating access device information of an access network that each terminal should access; and service indication information, indicating service information of each terminal and information about an access network that a service indicated by the service information should access.

According to a sixth aspect, an embodiment of the present invention provides a network offload apparatus, including:

a receiving module, configured to receive first access device state information sent by a first access device of a first access network;

a processing module, configured to generate offload condition information of the first access device according to the first access device state information received by the receiving module, where the offload condition information indicates a condition to be satisfied by a terminal allowed to access the first access device; and a sending module, configured to send the offload condition information to the first access device, so that the first access device determines, according to the offload condition information generated by the processing module, whether to allow a terminal to access.

According to a seventh aspect, an embodiment of the present invention provides a network controller, including the network offload apparatus according to the fourth aspect described above.

According to an eighth aspect, an embodiment of the present invention provides an offload decider, including the network offload apparatus according to the fifth aspect described above.

According to a ninth aspect, an embodiment of the present invention provides a network controller, including the network offload apparatus according to the sixth aspect described above.

According to the network offload method and apparatus provided in the embodiments of the present invention, a first network controller generates an offload policy for each terminal according to received network state information and sends the offload policy to a network-side device or the terminal, so that the network-side device or the terminal performs offload according to the offload policy, so that the network side can implement control on terminal offloading.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
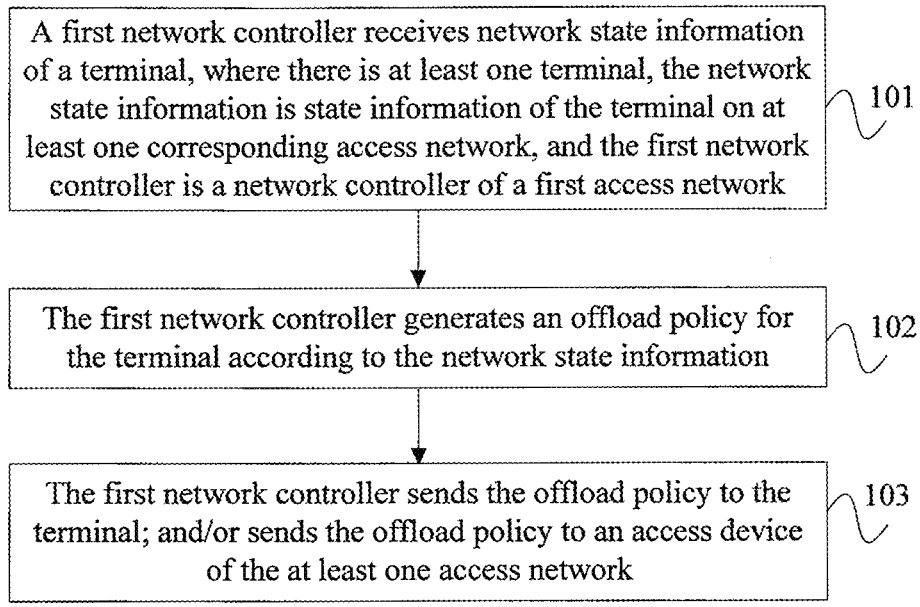
FIG. 1 is a flowchart of Embodiment 1 of a network offload method according to the present invention.

FIG. 1 is a flowchart of Embodiment 1 of a network offload method according to the present invention. This embodiment is executed by a first network controller, and is applicable to a scenario in which a network side controls an access action of a terminal when multiple access networks exist in a communications network. Specifically, this embodiment includes the following steps:

101. The first network controller receives network state information of a terminal, where there is at least one terminal, the network state information is state information of the terminal on at least one corresponding access network, and the first network controller is a network controller of a first access network.

When at least one access network exists in the communications network, a network controller of each access network receives network state information of all terminals or some terminals on a corresponding access network, where the terminals are on the communications network. For example, when two access networks, that is, a WLAN network and a cellular network, exist in the network, using an example in which a WLAN controller is the first network controller, the WLAN controller receives network state information of each terminal on the WLAN network and the cellular network.

Optionally; the first network controller receives the network state information of the terminal in the following manners:

Manner 1: The first network controller receives the network state information sent by the terminal.

In this manner, the first network controller directly receives the network state information sent by the terminal and transmitted transparently by a first access device. Specifically, the first network controller receives the network state information that is sent before the terminal has accessed the first access network or after the terminal has accessed the first access network, and then transmitted transparently by the first access device. In this process, the access device performs no processing on the network state information reported by the terminal, but directly forwards the network state information to the first network controller.

Manner 2: The first network controller receives the network state information sent by a first access device of the first access network and indicative of a state of the terminal on the first access network.

In this manner, the first access device of the first access network reports the network state information of the terminal on the first access network to the first network controller. Specifically, the first access device may collect and acquire the state information of the terminal on the first access network when the terminal is about to connect to the first access device to access the first access network or when the terminal has connected to the first access device, and sends the state information to the first network controller.

Manner 3: The first network controller receives the network state information sent by a network controller of another access network than the first access network and indicative of a state of the terminal on the another access network than the first access network.

In this manner, the network state information of the terminal that is received by the first network controller is network state information sent by the network controller of the another access network than the first access network before the terminal has accessed the access network or after the terminal has accessed the access network. For example, as for the foregoing network state information received by the WLAN controller and sent by the cellular network controller, the network state information sent by the cellular network controller may be state information of the terminal on the cellular network that is sent before the terminal has accessed the cellular network or after the terminal has accessed the cellular network.

Optionally, in the foregoing manner 1, the network state information sent by the terminal and received by the first network controller includes: state information of the terminal on the first access network to which the first network controller belongs; and/or state information of the terminal on the another access network than the first access network.

Specifically, when sending the network state information to the first network controller, the terminal may send only the state information of the terminal on the first access network to which the first network controller belongs; and/or may send the first network controller not only the state information of the terminal on the first access network to which the first network controller belongs, but also the state information of the terminal on the another network. For example, as described above, when the first network controller is a WLAN controller, the network state information received by the WLAN controller and reported by the terminal may include not only the network state information of the terminal on the WLAN network, but also the network state information of the terminal on the cellular network.

102. The first network controller generates an offload policy for the terminal according to the network state information.

In this step, the first network controller generates an offload policy for each terminal according to each piece of received network state information.

Optionally, the offload policy includes at least one type of the following information: access network indication information, indicating information about an access network that each terminal should access; access device indication information, indicating access device information of an access network that each terminal should access; and service indication information, indicating service information of each terminal and information about an access network that a service indicated by the service information should access.

Specifically, for a terminal that has not accessed the first access network, the offload policy generated by the first network controller according to each piece of received network state information may instruct the terminal to access the first access network or another access network, or instruct the terminal to let only some services access the first access network; for a terminal that has accessed the first access network, the generated offload policy may instruct the terminal to stay on the first access network, or be totally handed over to another access network, or hand over some services to another access network.

Further, if the offload policy indicates that the terminal can access or some services can access the first access network, the offload policy further includes information indicating an access device that the terminal should access.

103. The first network controller sends the offload policy to the terminal; and/or sends the offload policy to an access device of the at least one access network.

After generating the offload policy for each terminal, the first network controller sends the offload policy to a network-side device or the terminal, so that the network-side device or the terminal performs offload according to the offload policy.

Optionally, after generating the offload policy for each terminal, the first network controller sends the offload policy to the terminal, so that the terminal performs offload according to the offload policy.

Optionally, after generating the offload policy for each terminal, the first network controller sends the offload policy to the first access device, so that the first access device connects only a specified terminal according to the offload policy.

Specifically, the first access device may also control the access action of the terminal according to a local default access policy and the received offload policy, where the default access policy is, for example, allowing any terminal to access, not allowing some terminals or some services to access, or the like, and content of the offload policy includes information about terminals allowed to access and about terminals not allowed to access, or includes only information about terminals allowed to access, or the like.

For example, when the first access network is a WLAN, the offload policy may include information about all terminals allowed to access and not allowed to access. If the first access device allows, by default, any terminal to access, the first access device (AP) may first respond to probe request frames (Probe Requests) sent by all the terminals, that is, respond with a probe response frame (Probe Response) to allow the terminals to access. Because the offload policy includes the information about all the terminals allowed to access and not allowed to access, the first access device then dissociates some terminals or some services of some terminals according to the offload policy, for example, disables some terminals or some services, or the like. In this process, the first access device first allows terminals or all services of the terminals to access, and then dissociates some terminals or some services of some terminals according to the offload policy.

For another example, when the first access network is a WLAN, the offload policy may include only information about terminals allowed to access. If, by default, the first access device does not allow any terminals to access, that is, by default, the first access device (AP) does not respond to a probe request frame (Probe Request) sent by any terminal, because the offload policy includes only the information about terminals allowed to access, after receiving the offload policy, the AP responds, according to the offload policy, only to probe request frames (Probe Requests) sent by the terminals allowed to access, sends a probe response frame (Probe Response) to allow the terminals to access, and does not respond to Probe Requests sent by the terminals that are not allowed to access.

Optionally, after generating the offload policy for each terminal, the first network controller sends the offload policy to access devices or network controllers of other access networks than the first access network so that each access device or network controller performs offload.

According to the network offload method provided in the embodiment of the present invention, a first network controller generates an offload policy for each terminal according to received network state information and sends the offload policy to a network-side device or the terminal, so that the network-side device or the terminal performs offload according to the offload policy, so that the network side can implement control on terminal offloading.

Figure 2:
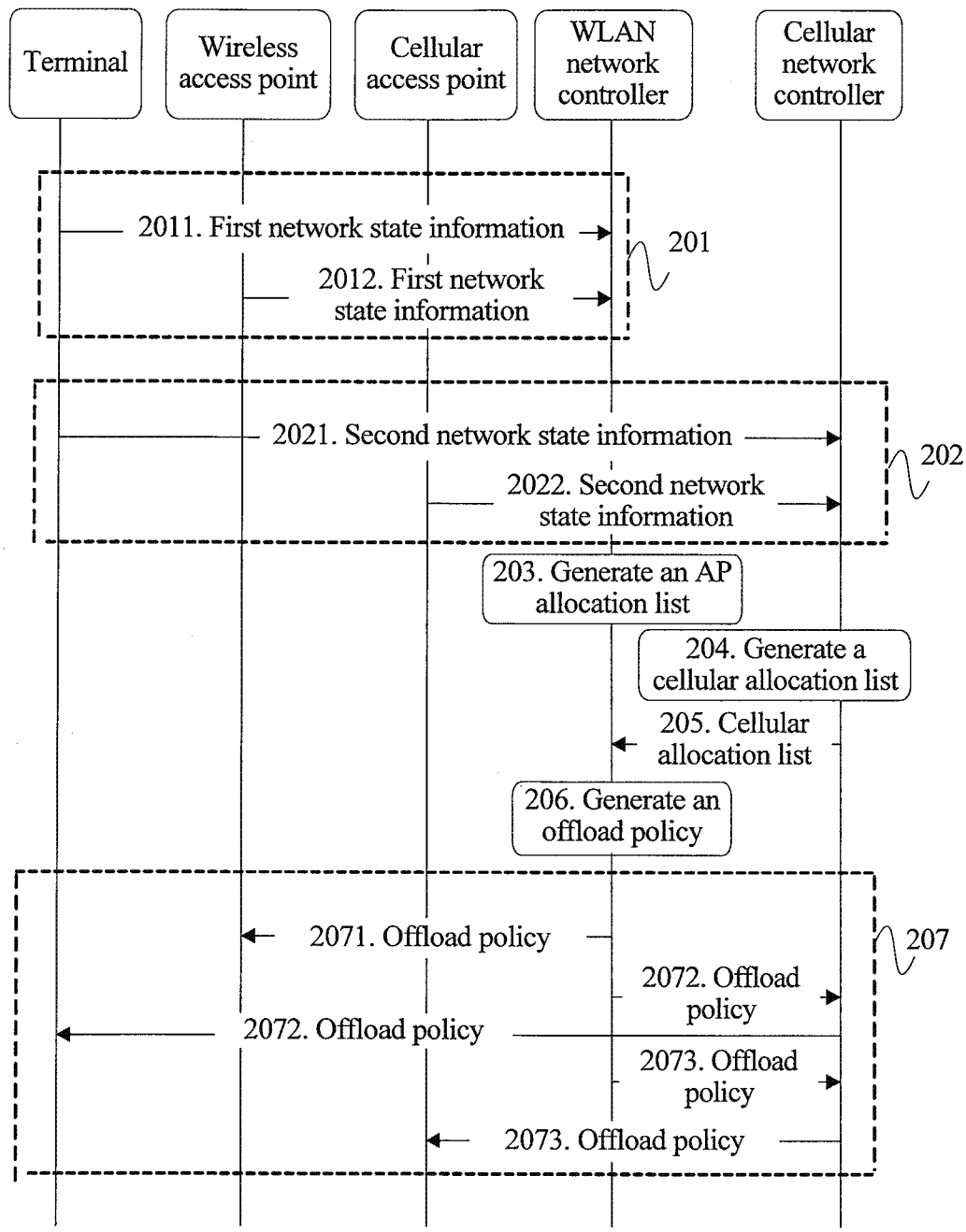
FIG. 2 is a signaling diagram of Embodiment 2 of a network offload method according to the present invention.

FIG. 2 is a signaling diagram of Embodiment 2 of a network offload method according to the present invention.

In this embodiment, a first network controller receives first network state information of a terminal on a first access network, where the first network state information is sent by the terminal and/or a first access device of the first access network to the first network controller. The first network controller receives a second allocation list sent by a second network controller of a second access network, where the second allocation list indicates a correspondence between each terminal and a second access device of the second access network. The second allocation list is obtained by the second network controller according to received second network state information of the terminal on the second access network, and the second network state information is sent by the terminal and/or the second access device of the second access network to the second network controller. The first network controller generates an offload policy for the terminal according to the first network state information and the second allocation list.

Optionally, after the first network controller receives the first network state information of the terminal on the first access network, the first network controller generates a first allocation list according to the first network state information, where the first allocation list indicates a correspondence between each terminal and the first access device of the first access network; and the first network controller generates the offload policy for the terminal according to the first allocation list and the second allocation list.

Referring to FIG. 2, in this embodiment, the first access network is a wireless local area network WLAN, the first network controller is a WLAN controller, the first access device is an access point (Access Point, AP), the second access network is a cellular network, the second network controller is a cellular network controller, and the second access device is a cellular access point. The cellular network controller and the WLAN controller collect and separately process information of terminals on their respective networks, and then the cellular network controller sends a processing result to the WLAN controller. The WLAN controller, that is, the first network controller, generates an offload policy. Specifically, this embodiment includes the following steps:

201. A WLAN controller receives first network state information of a terminal.

Specifically, this step may include the following sub-steps:

2011. The WLAN controller receives the first network state information sent by the terminal.

2012. The WLAN controller receives the first network state information sent by an AP.

In the steps 2011 and 2012, the first network state information may include: air interface side information of the terminal on the WLAN network, for example, strength and quality of a downlink signal received by the terminal from a current AP and a neighboring AP, and strength and quality of an uplink signal received by the current AP and the neighboring AP from the terminal; transmission information of the terminal, for example, a service type, service traffic, and total traffic; and information about an AP that covers the terminal and information about a neighboring AP, for example, an identifier and load of the AP.

Optionally, when the terminal is about to access the WLAN network or after the terminal has accessed the WLAN network, the terminal or the AP may obtain the first network state information and send the first network state information to the WLAN controller. Correspondingly, the WLAN controller receives the first network state information.

Optionally, in the step 2011, the first network state information may further include: information about the cellular network that can be obtained by the terminal, for example, downlink signal strength of the cellular network.

202. A cellular network controller receives second network state information of the terminal.

Specifically, this step may include the following substeps:

2021. The cellular network controller receives the second network state information sent by the terminal.

2022. The cellular network controller receives the second network state information sent by a cellular access point.

In the steps 2021 and 2022, the second network state information may include: air interface side information of the terminal on the cellular network, for example, strength and quality of an uplink or downlink signal of the terminal in a current cell and a neighboring cell; transmission information of the terminal, for example, a service type, service traffic, and total traffic; and information about a cell that covers the terminal and information about a neighboring cell, for example, a cell number and load.

Optionally, when the terminal is about to access the cellular network or after the terminal has accessed the cellular network, the terminal or the cellular access point may obtain the second network state information and send the second network state information to the cellular network controller. Correspondingly, the cellular network controller receives the second network state information.

Optionally, in the step 2021, the second network state information may further include: information about the WLAN network that can be obtained by the terminal, for example, scanned signal strength of the AP, and a rate supported by the AP.

203. The WLAN controller generates an AP allocation list.

In this step, after obtaining the information about the terminal on the WLAN, that is, after receiving the first network state information of the terminal, according to the signal strength obtained by the current AP and the neighboring AP from the terminal, the load of the current AP and the neighboring AP, a quantity of access terminals, and the like, the WLAN controller determines whether a terminal that has not accessed the WLAN or some services of the terminal are allowed to access the AP of the WLAN, and whether a terminal that has accessed the WLAN or some services of the terminal are allowed to stay on the WLAN network, where the signal strength is, for example, a received signal strength indicator (Received Signal Strength Indicator, RSSI). According to a result of the determining, a list is generated in which all terminals and APs are in a one-to-one correspondence, where the list is called an AP allocation list, that is, the first allocation list. The AP allocation list includes: whether an AP is allocated to a terminal, information about a terminal to which an AP is allocated, information about the allocated AP, and the like.

204. The cellular network controller generates a cellular allocation list.

In this step, after obtaining the information about the terminal on the cellular network, that is, after receiving the second network state information of the terminal, according to the uplink or downlink signal strength of the terminal, services, and the load of the current cell and the neighboring cell, and the like, the cellular network controller determines whether a terminal that has not accessed the cellular network or some services of the terminal are allowed to access the cellular access point of the cellular network, and whether a terminal that has accessed the cellular network or some services of the terminal are allowed to stay on the cellular network. According to a result of the determining, a list is generated in which terminals and cellular access points are in a one-to-one correspondence, where the list is called a cellular allocation list, that is, the second allocation list. The cellular allocation list includes: whether a terminal stays on or accesses a cellular network, information about the terminal, information about a corresponding cellular access point, and the like, where the information about the terminal may include an identifier of the terminal and the like, and the information about the cellular access point may include an identifier of the cellular access point and the like.

205. The cellular network controller sends the cellular allocation list to the WLAN controller.

In this step, the cellular network controller sends all or part of content of the cellular allocation list to the WLAN controller, and the sent content includes at least the identifier of the terminal.

206. The WLAN controller generates an offload policy.

According to the AP allocation list and the cellular allocation list, the WLAN controller makes a decision and generates the offload policy for the terminal. The terminal is classified into a terminal that supports only a WLAN (that is, a WiFi only terminal) and an offloading terminal, and can be identified by the WLAN controller by comparing the AP allocation list with the cellular allocation list. The offloading terminal refers to a terminal that can access both a WLAN network and a cellular network. Optionally, the offload policy may include access network indication information, where the access network indication information instructs the terminal to access or stay on only a specific network, or instructs the terminal to be totally handed over to another network and disconnected from the current network, or instructs the terminal to connect to two or more networks simultaneously and perform transmission on the two or more networks simultaneously.

Optionally, the offload policy may include access device indication information, indicating access device information of an access network that the terminal should access, such as an identifier of the access device.

Optionally, the offload policy may include service indication information, indicating service information of each terminal and information about an access network that a service indicated by the service information should access.

Understandably, one terminal may have different identifiers on different access networks. Therefore, in a practical implementation process, the identifier of the terminal may need to be converted. For example, in this embodiment, the WLAN controller may maintain an identifier list, and a correspondence between an identifier of the terminal on the WLAN network and an identifier of the terminal on the cellular network is stored in the identifier list. According to the list, state information of the same terminal on different networks can be determined. Alternatively, the identifier list may be maintained on the cellular controller so that in the foregoing step 205, the cellular controller converts the identifier and then sends the converted identifier to the WLAN controller. In addition, a relay device with an identifier conversion function may be configured separately, and the identifier list is stored in the relay device so that in the foregoing step 205, the cellular controller sends identifiers of all or some of the terminals in the cellular allocation list to the relay device, and the relay device converts the identifiers. When the identifiers are converted by the relay device, the relay device may convert all or some of the identifiers of the terminals in the received cellular allocation list into identifiers of the terminals on the WLAN network, and then directly send the identifiers to the WLAN controllers or forward the identifiers to the WLAN controller via the cellular network controller.

207. The WLAN controller sends the offload policy.

Specifically, this step includes the following optional sub-steps:

2071. The WLAN controller sends the offload policy to the AP.

The WLAN controller sends the offload policy to the AP, and the AP acts according to the offload policy, for example, allows access of only a specified terminal or disables some services of an access terminal.

2072. The WLAN controller sends the offload policy to the terminal.

The WLAN controller sends the offload policy to the terminal via the cellular network controller, so that the terminal acts according to the offload policy, for example, accesses a specified AP.

2073. The WLAN controller sends the offload policy to the cellular access point.

The WLAN network sends the offload policy to the cellular access point via the cellular network controller, so that the cellular access point acts according to the offload policy, for example, allows access of the offloading terminal in the step 206.

In a specific implementation process, the WLAN controller may choose to perform at least one of the foregoing sub-steps.

It should be noted that the foregoing steps 201 and 202 are not subject to a strict chronological order, and the foregoing steps 203 and 204 are not subject to a strict chronological order.

In addition, it should be noted that the foregoing step 203 is an optional step. That is, the WLAN controller may not generate the AP allocation list, but directly make a decision for the terminals in the cellular allocation list with reference to the received first network state information of the terminal on the WLAN network after receiving the cellular allocation list sent by the cellular network controller, and generates the offload policy.

Figure 3:
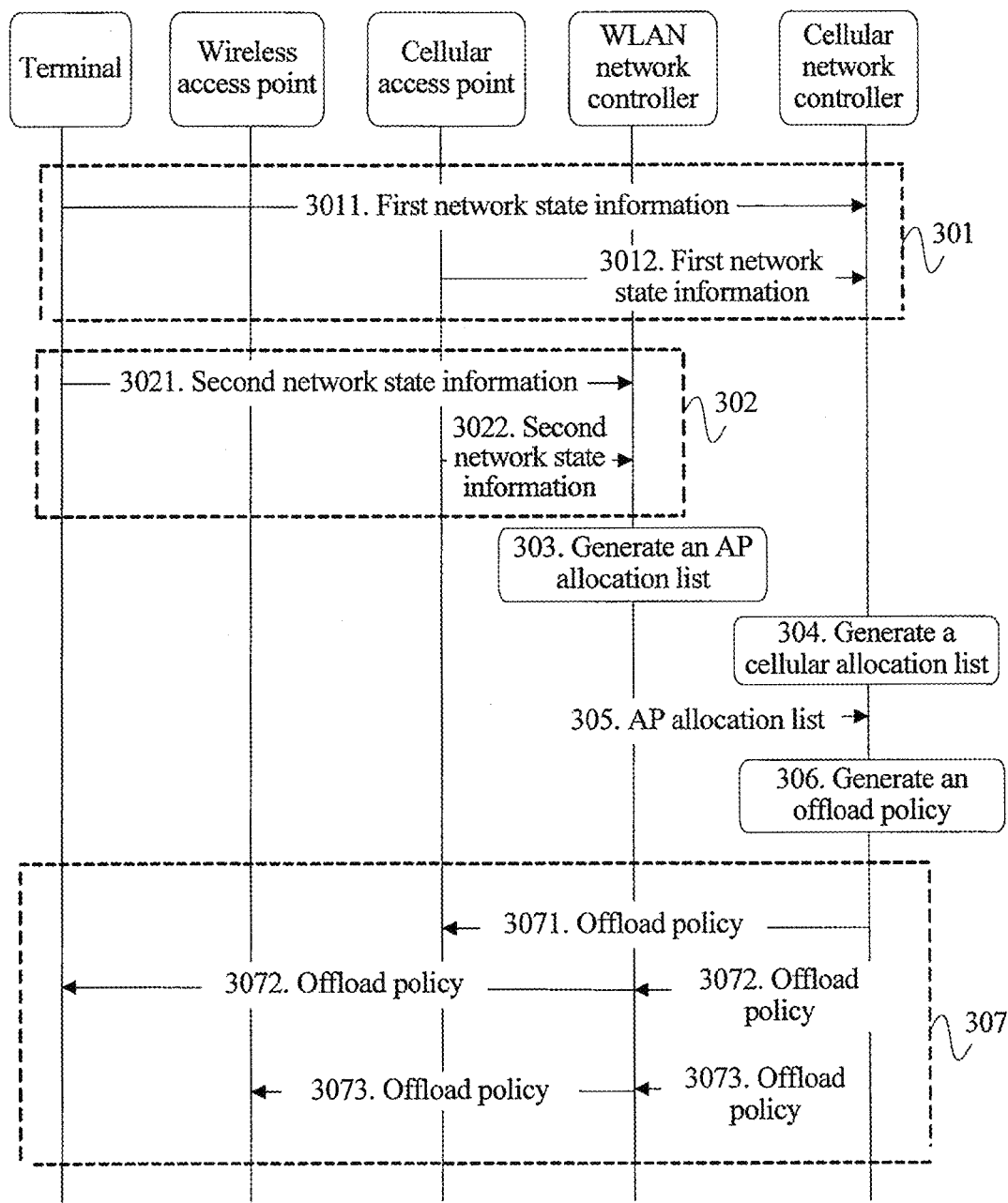
FIG. 3 is a signaling diagram of Embodiment 3 of a network offload method according to the present invention.

FIG. 3 is a signaling diagram of Embodiment 3 of a network offload method according to the present invention. Different from the foregoing embodiment in FIG. 2, in this embodiment, two access networks exist in a communications network, a first access network is a cellular network, a first network controller is a cellular network controller, a first access device is a cellular access point, a second access network is a wireless local area network WLAN, a second network controller is a WLAN controller, and a second access device is an access point AP. The cellular network controller and the WLAN controller collect and separately process information of terminals on their respective networks, and then the WLAN controller sends a processing result to the cellular network controller. The cellular network controller, that is, the first network controller, generates an offload policy. Specifically, this embodiment includes the following steps:

301. A cellular network controller receives first network state information of a terminal.

Specifically, this step may include the following sub-steps:

3011. The cellular network controller receives the first network state information sent by the terminal.

3012. The cellular network controller receives the first network state information sent by a cellular access point.

302. A WLAN controller receives second network state information of the terminal.

Specifically, this step may include the following sub-steps:

3021. The WLAN controller receives the second network state information sent by the terminal.

3022. The WLAN controller receives the second network state information sent by an AP.

303. The WLAN controller generates an AP allocation list.

304. The cellular network controller generates a cellular allocation list.

For specific description of the foregoing steps 301 to 304, reference may be made to the steps 201 to 204 in FIG. 2, and details are not repeatedly described herein.

305. The WLAN controller sends an AP allocation list to the cellular network controller.

In this step, the WLAN controller sends all or part of content of the AP allocation list to the cellular network controller, and the sent content includes at least an identifier of the terminal.

306. The cellular network controller generates an offload policy.

According to the AP allocation list and the cellular allocation list, the cellular network controller makes a decision and generates the offload policy for the terminal.

Specifically, for description of the offload policy, reference may be made to the foregoing step 206, and details are not repeatedly described herein.

Understandably, a same terminal may have different identifiers on different access networks. Therefore, in a practical implementation process, the identifier of the terminal may need to be converted. For example, in this embodiment, the cellular network controller may maintain an identifier list, and a correspondence between the identifier of the terminal on the WLAN network and the identifier of the terminal on the cellular network is stored in the identifier list. According to the list, state information of the same terminal on different networks can be determined. Alternatively, the identifier list may be maintained on the WLAN controller so that in the foregoing step 305, the WLAN controller converts the identifier and then sends the converted identifier to the cellular network controller. In addition, a relay device with an identifier conversion function may be configured separately, and the identifier list is stored in the relay device so that in the foregoing step 305, the WLAN controller sends identifiers of all or some of the terminals in the AP allocation list to the relay device, and the relay device converts the identifiers. When the identifiers are converted by the relay device, the relay device may convert all or some of the identifiers of the terminals in the received AP allocation list into identifiers of the terminals on the cellular network, and then directly send the identifiers to the cellular network controllers or forward the identifiers to the cellular network controller via the WLAN controller.

307. The cellular network controller sends the offload policy.

Specifically, this step includes the following optional sub-steps:

3071. The cellular network controller sends the offload policy to the cellular access point.

The cellular network controller sends the offload policy to the cellular access point, so that the cellular access point acts according to the offload policy, for example, allows access of only a specified terminal and disables some services of an access terminal.

3072. The cellular network controller sends the offload policy to the terminal.

The cellular network controller sends the offload policy to the terminal via the WLAN controller, so that the terminal acts according to the offload policy, for example, accesses a specified cellular access point.

3073. The cellular network controller sends the offload policy to the AP.

The cellular network sends the offload policy to the AP via the WLAN controller, so that the AP performs access of a specified terminal according to the offload policy, for example, allows access of an offloading terminal in the step 306.

In a specific implementation process, the cellular network controller may choose to perform at least one of the foregoing sub-steps.

It should be noted that the foregoing step 304 is an optional step. That is, the cellular network controller may not generate the cellular allocation list, but directly makes a decision for the terminals in the AP allocation list with reference to the received first network state information of the terminal on the cellular network after receiving the AP allocation list sent by the WLAN controller, and generates the offload policy.

Figure 4:
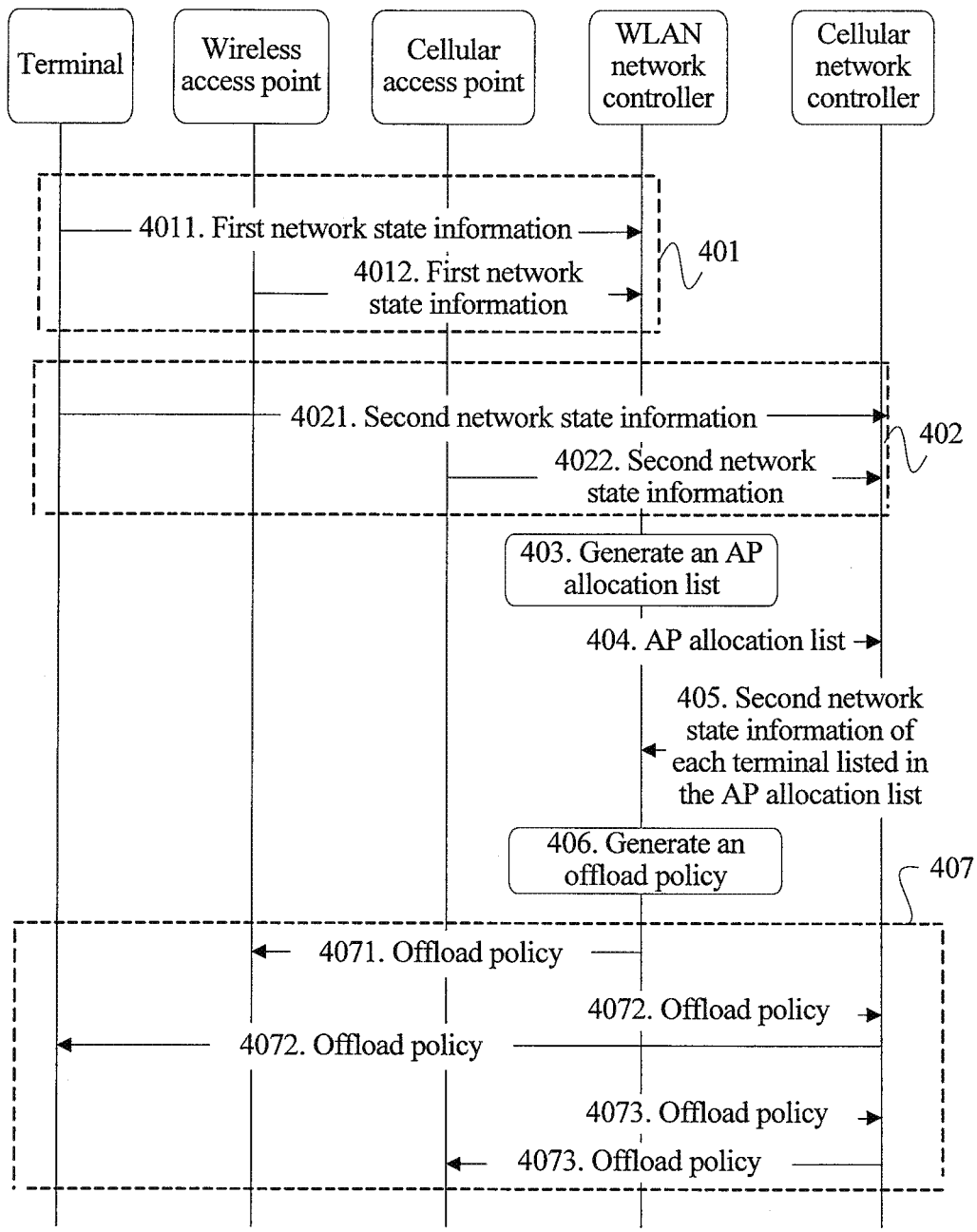
FIG. 4 is a signaling diagram of Embodiment 4 of a network offload method according to the present invention.

FIG. 4 is a signaling diagram of Embodiment 4 of a network offload method according to the present invention. In this embodiment, after a first network controller receives network state information of a terminal, the first network controller generates a first allocation list according to the first network state information, where the first allocation list indicates a correspondence between each terminal and a first access device of a first access network.

The first network controller sends first allocation list information to a second network controller of a second access network, where the first allocation list information includes at least identification information of each terminal in the first allocation list, so that the second network controller sends second network state information of each terminal in the first allocation list to the first network controller according to the identification information of each terminal in the first allocation list.

The first network controller generates an offload policy for each terminal in the first allocation list information according to the second network state information of each terminal in the first allocation list information.

Referring to FIG. 4, in this embodiment, two access networks exist in a communications network, the first access network is a wireless local area network WLAN, the first network controller is a WLAN controller, the first access device is an access point AP, the second access network is a cellular network, the second network controller is a cellular network controller, and the second access device is a cellular access point. Different from the foregoing embodiment in FIG. 2, in this embodiment, first, the WLAN controller determines an AP allocation list, that is, the first allocation list, and sends the AP allocation list to the cellular network controller. The cellular network controller sends only network state information of a terminal that is listed in the AP allocation list and is on the cellular network to the WLAN controller, and the WLAN controller generates the offload policy. Specifically, this embodiment includes the following steps:

401. A WLAN controller receives first network state information of a terminal.

Specifically, this step may include the following sub-steps:

4011. The WLAN controller receives the first network state information sent by the terminal.

4012. The WLAN controller receives the first network state information sent by an AP.

402. A cellular network controller receives second network state information of the terminal.

Specifically, this step may include the following sub-steps:

4021. The cellular network controller receives second network state information sent by the terminal.

4022. The cellular network controller receives the second network state information sent by a cellular access point.

403. The WLAN controller generates an AP allocation list.

For specific description of the foregoing steps 401 to 403, reference may be made to the steps 201 to 203 in FIG. 2, and details are not repeatedly described herein.

404. The WLAN controller sends an AP allocation list to the cellular network controller.

In this step, the WLAN controller sends all or part of content of the AP allocation list to the cellular network controller, and the sent content includes at least an identifier of the terminal.

405. The cellular network controller sends second network state information of each terminal listed in the AP allocation list to the WLAN controller.

In this step, according to the AP allocation list, the cellular network controller sends information about all or some of the terminals that are listed in the AP allocation list and are on the cellular network, that is, the second network state information, to the WLAN controller. For terminals that are not listed in the AP allocation list, the cellular network controller performs processing on its own.

406. The WLAN controller generates an offload policy.

A difference from the foregoing step 206 in FIG. 2 lies in that in the step 206, the WLAN controller performs policy allocation for each terminal on the communications network, that is, makes the decision and generates the offload policy for all terminals listed in the AP allocation list and the cellular allocation list; but in this step, the decision is made and the offload policy is generated only for all or some of the terminals listed in the AP allocation list.

407. The WLAN controller sends the offload policy.

Specifically, this step includes the following optional sub-steps:

4071. The WLAN controller sends the offload policy to the AP.

The WLAN controller sends the offload policy to the AP, and the AP acts according to the offload policy, for example, allows access of only a specified terminal.

4072. The WLAN controller sends the offload policy to the terminal.

The WLAN controller sends the offload policy to the terminal via the cellular network controller, so that the terminal acts according to the offload policy, for example, accesses a specified AP.

4073. The WLAN controller sends the offload policy to the cellular access point.

The WLAN network sends the offload policy to the cellular access point via the cellular network controller, so that the cellular access point acts according to the offload policy, for example, allows access of an offloading terminal in the AP allocation list.

In a specific implementation process, the WLAN controller may choose to perform at least one of the foregoing sub-steps.

Figure 5:
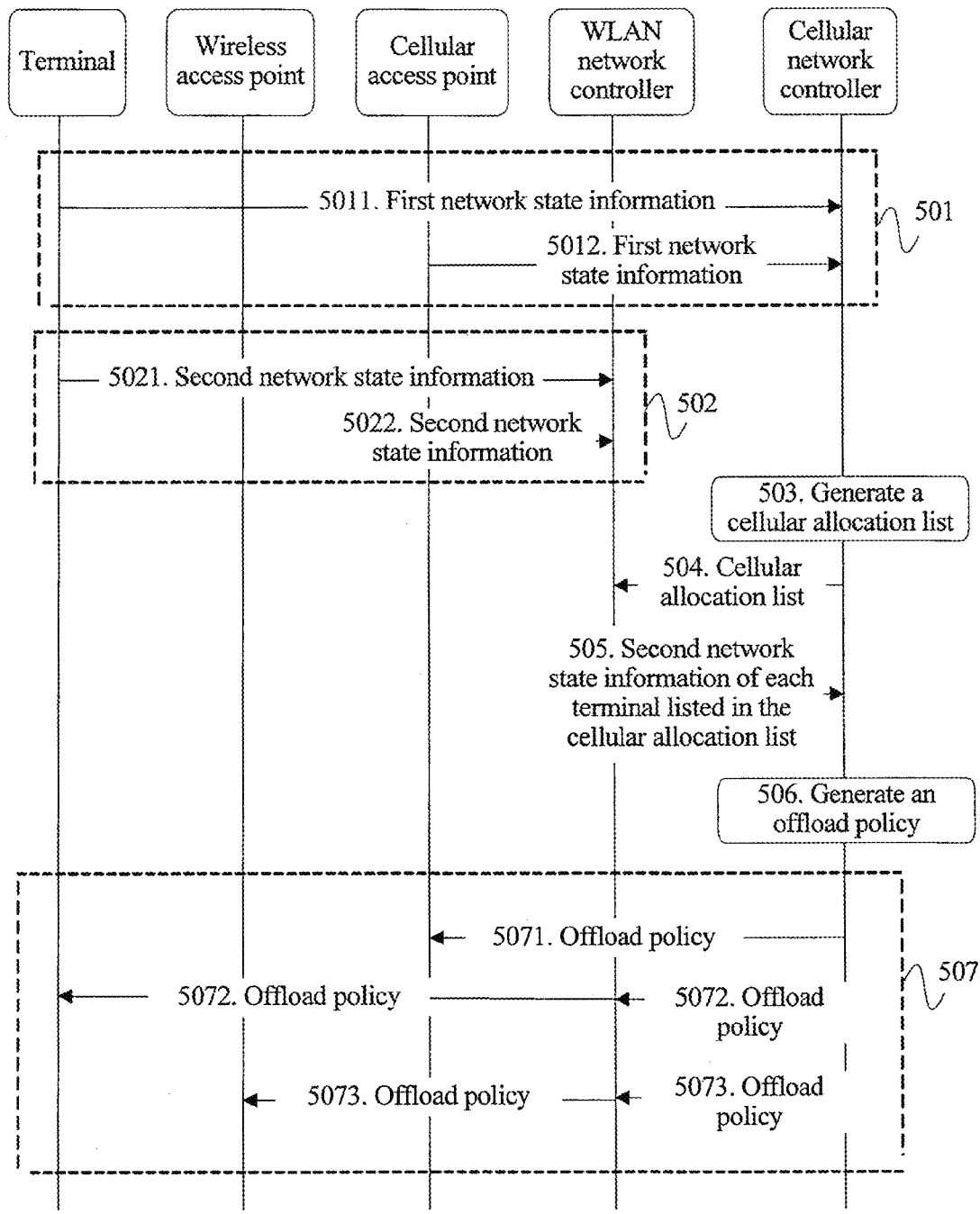
FIG. 5 is a signaling diagram of Embodiment 5 of a network offload method according to the present invention.

FIG. 5 is a signaling diagram of Embodiment 5 of a network offload method according to the present invention. In this embodiment, two access networks exist in a communications network, a first access network is a cellular network, a first network controller is a cellular network controller, a first access device is a cellular access point, a second access network is a wireless local area network WLAN, a second network controller is a WLAN controller, and a second access device is an access point AP. Different from the foregoing embodiment in FIG. 3, in this embodiment, first, the cellular network controller determines a cellular allocation list, that is, a first allocation list, and sends the cellular allocation list to the WLAN controller. The WLAN controller sends only network state information of a terminal that is listed in the cellular allocation list and is on the WLAN network to the cellular network controller, and the cellular network controller generates an offload policy. Specifically, this embodiment includes the following steps:

501. A cellular network controller receives first network state information of a terminal.

Specifically, this step may include the following sub-steps:

5011. The cellular network controller receives the first network state information sent by the terminal.

5012. The cellular network controller receives the first network state information sent by a cellular access point.

502. A WLAN controller receives second network state information of the terminal.

5021. The WLAN controller receives the second network state information sent by the terminal.

5022. The WLAN controller receives the second network state information sent by an AP.

503. The cellular network controller generates a cellular allocation list.

For specific description of the foregoing steps 501 and 502, reference may be made to the steps 201 and 202 in FIG. 2; for the step 503, reference may be made to the foregoing step 204 in FIG. 2, and details are not repeatedly described herein.

504. The cellular network controller sends the cellular allocation list to the WLAN controller.

In this step, the cellular network controller sends all or part of content of the cellular allocation list to the WLAN controller, and the sent content includes at least an identifier of the terminal.

505. The WLAN controller sends second network state information of each terminal listed in the cellular allocation list to the cellular network controller.

In this step, according to the cellular allocation list, the cellular network controller sends information of all or some of terminals that are listed in the cellular allocation list and are on the WLAN network, that is, the second network state information, to the cellular network controller. For terminals that are not listed in the cellular allocation list, the WLAN controller performs processing on its own.

506. The cellular network controller generates an offload policy.

A difference from the foregoing step 306 in FIG. 3 lies in that in the step 306, the cellular network controller performs policy allocation for each terminal on the communications network, that is, makes the decision and generates the offload policy for all terminals listed in the AP allocation list and the cellular allocation list; but in this step, the decision is made and the offload policy is generated only for all or some of the terminals listed in the cellular allocation list.

507. The cellular network controller sends the offload policy.

Specifically, this step includes the following optional sub-steps:

5071. The cellular network controller sends the offload policy to the cellular access point.

The cellular network controller sends the offload policy to the cellular access point, and the cellular access point acts according to the offload policy, for example, allows access of only a specified terminal, where the specified terminal is a terminal listed in the cellular allocation list.

5072. The cellular network controller sends the offload policy to the terminal.

The cellular network controller sends the offload policy to the terminal via the WLAN controller, so that the terminal acts according to the offload policy, for example, accesses a specified cellular access point, where the specified cellular access point is a terminal listed in the cellular allocation list.

5073. The cellular network controller sends the offload policy to the AP.

The cellular network sends the offload policy to the AP via the WLAN controller, so that the AP acts according to the offload policy, for example, allows access of an offloading terminal in the cellular allocation list.

In a specific implementation process, the cellular network controller may choose to perform at least one of the foregoing sub-steps.

Figure 6:
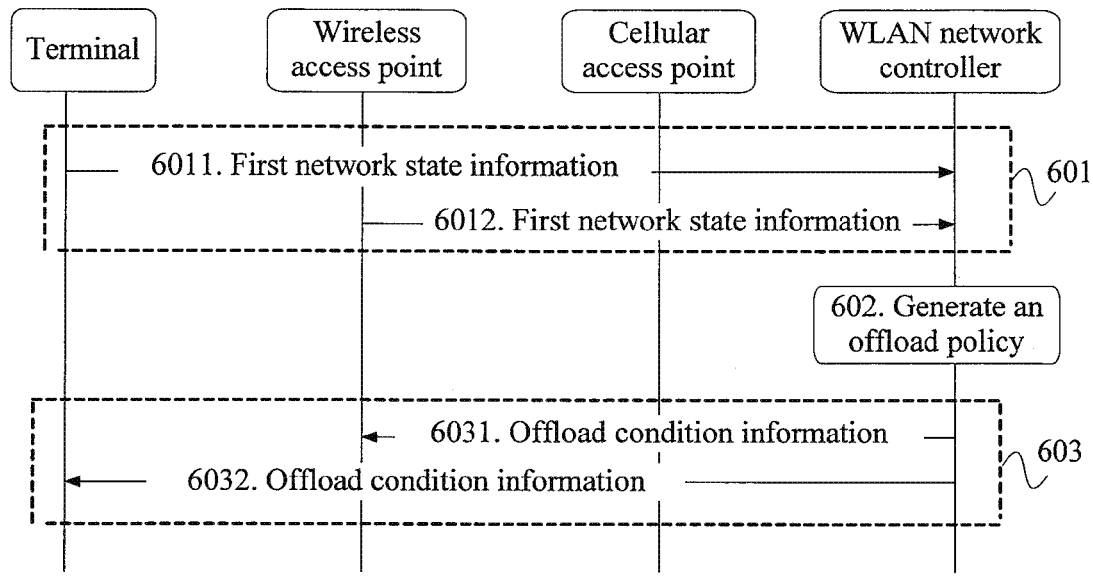
FIG. 6 is a signaling diagram of Embodiment 6 of a network offload method according to the present invention.

FIG. 6 is a signaling diagram of Embodiment 6 of a network offload method according to the present invention. In this embodiment, a first network controller receives first network state information of a terminal on a first access network, where the first network state information is sent by the terminal and/or a first access device of the first access network to the first network controller; and the first network controller generates an offload policy for the terminal according to the first network state information.

Referring to FIG. 6, in this embodiment, the first access network is a wireless local area network WLAN, and the first network controller is a WLAN controller. Different from the embodiments described above, in this embodiment, the first network controller generates an offload policy according to only network state information reported by the terminal or an AP. Specifically, this embodiment includes the following steps:

601. A WLAN controller receives first network state information of a terminal.

Specifically, this step may include the following sub-steps:

6011. The WLAN controller receives the first network state information sent by the terminal.

6012. The WLAN controller receives the first network state information sent by an AP.

Optionally, in the step 6011, the first network state information may further include: information about the cellular network that can be obtained by the terminal, for example, downlink signal strength of the cellular network.

602. The WLAN controller generates an offload policy.

In this step, the WLAN controller generates an offload policy for a terminal whose network state information is reported by the terminal or the AP.

It should be noted that if the WLAN controller has stored network state information of one or more other terminals, the WLAN controller may further generate an offload policy for the one or more other terminals whose information has been stored.

603. The WLAN controller sends the offload policy.

Optionally, this step may include the following sub-steps:

6031. The WLAN controller sends the offload policy to the AP.

6032. The WLAN controller sends the offload policy to the terminal.

Figure 7:
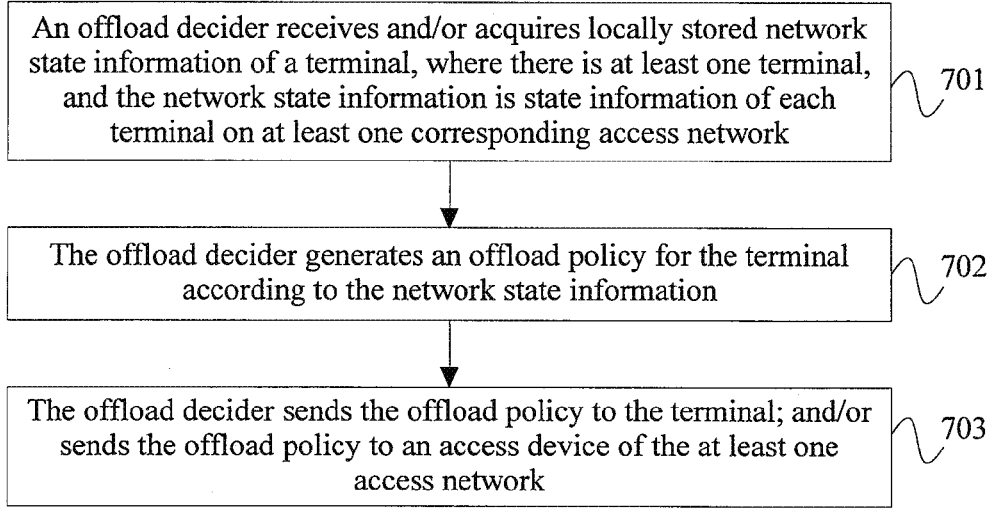
FIG. 7 is a flowchart of Embodiment 7 of a network offload method according to the present invention.

FIG. 7 is a flowchart of Embodiment 7 of a network offload method according to the present invention. This embodiment is executed by an offload decider, and is applicable to a scenario in which a network side controls an access action of a terminal when multiple access networks exist in a communications network. Specifically, this embodiment includes the following steps:

701. An offload decider receives and/or acquires locally stored network state information of a terminal, where there is at least one terminal, and the network state information is state information of each terminal on at least one corresponding access network.

The offload decider is a network-side device independent of a network controller of each access network, and has a function of generating an offload policy for the terminal according to the state information of the terminal on each access network. In this step, when at least one access network exists in a communications network, the offload decider receives state information of all terminals or some terminals on each access network.

Optionally, the offload decider may receive the network state information of the terminal in the following manners:

Manner 1: The offload decider receives the network state information sent by each terminal.

In this manner, the offload decider directly receives the network state information sent by the terminal. That is, the offload decider directly interacts with the terminal, and no other network element is involved in the interaction process. For example, when a WLAN network and a cellular network coexist in the communications network, the terminal may directly send the state information of the terminal on the WLAN network and the state information of the terminal on the cellular network to the offload decider.

Manner 2: The offload decider receives the network state information of the terminal that is sent by the network controller of each access network, where the network state information is sent by the terminal to the network controller of each access network and/or sent by the access device of each access network to a network controller corresponding to the access device.

In this manner, each terminal directly reports the network state information to the network controller of each access network, or the access device of each access network reports the state information of the terminal on the corresponding access network to the network controller. Subsequently, the network controller of each access network sends all information to one offload decider; correspondingly, the offload decider receives the network state information.

Optionally, in the foregoing manner 2, if the network state information received by the offload decider is information forwarded by the network controller after the information is directly reported by the terminal to the network controller, the network state information includes state information of the terminal on the access network to which the network controller belongs, and/or state information of the terminal on another access network than the access network to which the network controller belongs.

702. The offload decider generates an offload policy for the terminal according to the network state information.

In this step, the offload decider generates an offload policy for each terminal according to each piece of received network state information.

Optionally, the offload policy includes at least one type of the following information: access network indication information, indicating information about an access network that each terminal should access; access device indication information, indicating access device information of an access network that each terminal should access; and service indication information, indicating service information of each terminal and information about an access network that a service indicated by the service information should access.

Specifically, for a terminal that has not accessed any access network, the offload policy generated by the offload decider according to each piece of received network state information may indicate a target access network of the terminal, or indicate a target access network of only some services of the terminal; for a terminal that has accessed a specific access network, the generated offload policy may instruct the terminal to stay on the current network, or be totally handed over to another access network, or hand over some services to another access network.

Further, if the offload policy indicates that the terminal can access or some services can access a specific access network, the offload policy further includes information about an access device of the indicated access network that the terminal should access.

703. The offload decider sends the offload policy to the terminal; and/or sends the offload policy to an access device of the at least one access network.

After generating the offload policy for each terminal, the offload decider sends the offload policy to a network-side device or the terminal, so that the network-side device or the terminal performs offload according to the offload policy.

Optionally, after generating the offload policy for each terminal, the offload decider sends the offload policy to the terminal, so that the terminal performs offload according to the offload policy.

Optionally, after generating the offload policy for each terminal, the offload decider sends the offload policy to the corresponding access device via the network controller of each access network, so that each access device connects only a specified terminal according to the offload policy.

According to the network offload method provided in the embodiment of the present invention, an offload decider generates an offload policy for each terminal according to received network state information and sends the offload policy to a network-side device or the terminal, so that the network-side device or the terminal performs offload according to the offload policy, so that the network side can implement control on terminal offloading.

Figure 8:
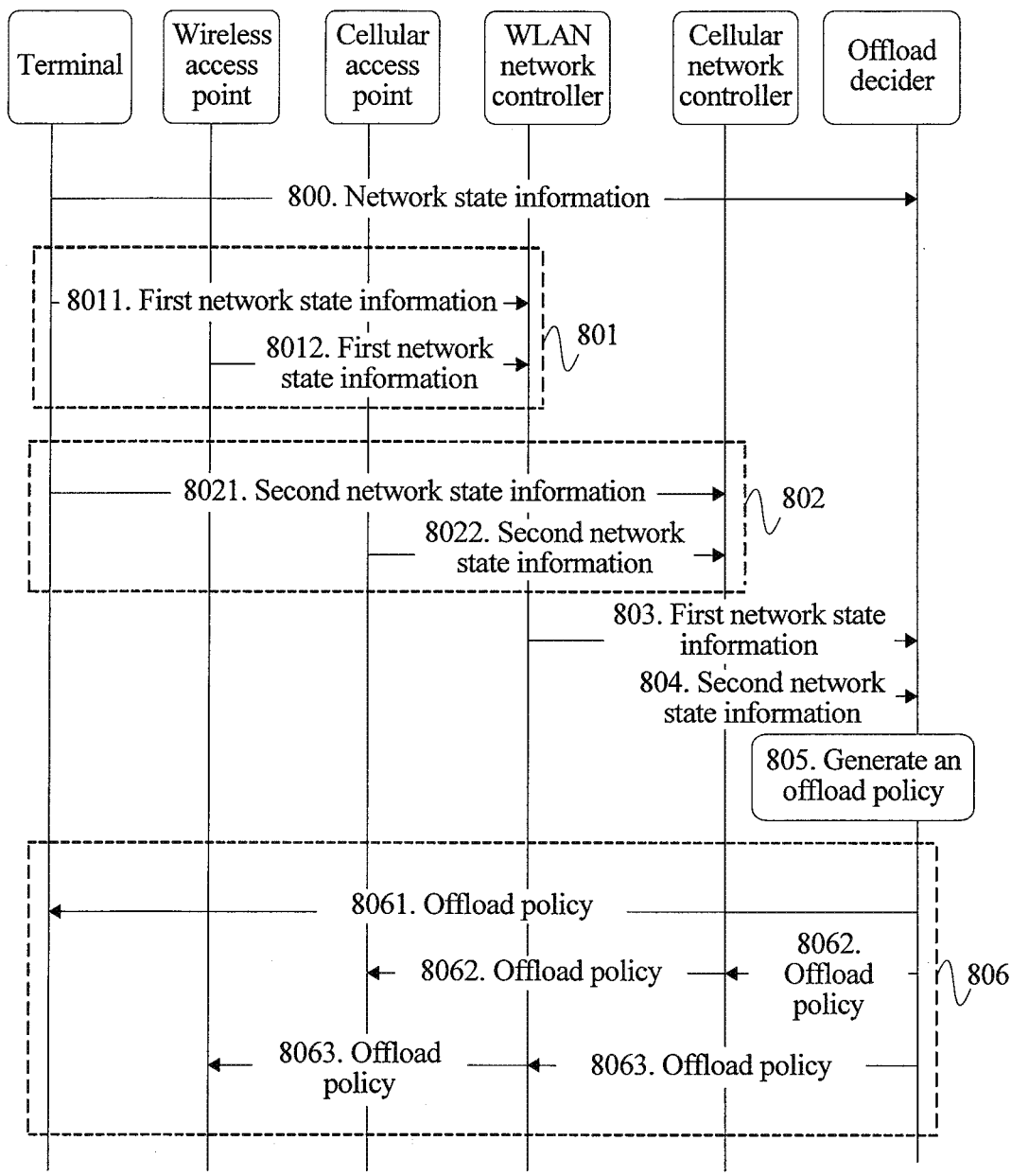
FIG. 8 is a signaling diagram of Embodiment 8 of a network offload method according to the present invention.

FIG. 8 is a signaling diagram of Embodiment 8 of a network offload method according to the present invention. In this embodiment, an offload decider receives first network state information sent by a first network controller of a first access network, and second network state information sent by a second network controller of a second access network; and generates an offload policy for a terminal according to the first network state information and the second network state information.

Further, in this embodiment, the information received by the offload decider is obtained after the network controller processes the network state information. For example, for the scenario in which two types of access networks exist in a communications network, in a first possible implementation manner, the first network controller of the first access network may generate a first allocation list according to the first network state information and send the first allocation list to the offload decider, where the first allocation list indicates a correspondence between each terminal and a first access device of the first access network. The network state information is directly reported by the terminal to the first network controller, or reported by the first access device of the first access network to the first network controller. After receiving the first allocation list, the offload decider generates an offload policy for the terminal according to the first allocation list and the second network state information.

In a second possible implementation manner, the second network controller of the second access network may generate a second allocation list according to the second network state information and send the second allocation list to the offload decider, where the second allocation list indicates a correspondence between each terminal and a second access device of the second access network. The network state information is directly reported by the terminal to the second network controller, or reported by the second access device of the second access network to the second network controller. After receiving the second allocation list, the offload decider generates an offload policy for the terminal according to the second allocation list and the first network state information.

In a third possible implementation manner, the offload decider receives a first allocation list generated by the first network controller according to the first network state information, and a second allocation list generated by the second network controller according to the second network state information, where the first allocation list indicates a correspondence between each terminal and a first access device of the first access network, and the second allocation list indicates a correspondence between each terminal and a second access device of the second access network; and generates an offload policy for the terminal according to the first allocation list and the second allocation list.

Referring to FIG. 8, in this embodiment, the first access network is a wireless local area network WLAN, the first network controller is a WLAN controller, the first access device is an access point AP, the second access network is a cellular network, the second network controller is a cellular network controller, and the second access device is a cellular access point. The cellular network controller and the WLAN controller collect and separately process information of terminals on their respective networks, and then the cellular network controller and the WLAN controller send processing results to the offload decider, and the offload decider generates an offload policy. Specifically, this embodiment includes the following steps:

800. A terminal sends network state information to an offload decider.

In this step, the terminal directly reports the state information of the terminal on a WLAN network and the state information of the terminal on a cellular network to the offload decider.

801. A WLAN controller receives first network state information of the terminal.

Specifically, this step may include the following substeps:

8011. The WLAN controller receives the first network state information sent by the terminal.

8012. The WLAN controller receives the first network state information sent by an AP.

802. A cellular network controller receives second network state information of the terminal.

Specifically, this step may include the following substeps:

8021. The cellular network controller receives the second network state information sent by the terminal.

8022. The cellular network controller receives the second network state information sent by a cellular access point.

For the foregoing steps 801 and 802, reference may be made to the steps 201 and 202 in FIG. 2, and details are not repeatedly described herein.

It should be noted that the foregoing step 800 and the steps 801 and 802 may be performed concurrently, or only one of them may be performed. For example, only the step 800 is performed, or only the steps 801 and 802 are performed.

803. The WLAN controller sends the first network state information to the offload decider.

804. The cellular network controller sends the second network state information to the offload decider.

The foregoing steps 803 and 804 are not subject to a strict chronological order.

805. The offload decider generates an offload policy.

In this step, the offload decider generates an offload policy for each terminal according to the first network state information and the second network state information.

806. The offload decider sends the offload policy.

Specifically, this step may include the following substeps:

8061. The offload decider sends the offload policy to the terminal.

8062. The offload decider sends the offload policy to the cellular access point.

The offload decider sends the offload policy to the cellular access point via the cellular network controller.

8063. The offload decider sends the offload policy to the AP.

The offload decider sends the offload policy to the AP via the WLAN controller.

Optionally, after the foregoing step 801 and after receiving the first network state information, according to signal strength of the terminal that is obtained by a current AP and a neighboring AP, load of the current AP and the neighboring AP, a quantity of access terminals, and the like, the WLAN controller determines whether a terminal that has not accessed the WLAN or some services of the terminal are allowed to access the AP of the WLAN, and whether a terminal that has accessed the WLAN or some services of the terminal are allowed to stay on the WLAN network, where the signal strength is, for example, an RSSI. According to a result of the determining, a list is generated in which terminals and APs are in a one-to-one correspondence, where the list is called an AP allocation list, that is, the first allocation list. The AP allocation list includes: whether an AP is allocated to a terminal, information about a terminal to which an AP is allocated, information about the allocated AP, and the like. Subsequently, the AP allocation list is sent to the offload decider, and the offload decider generates an offload policy according to the AP allocation list and the second network state information.

Optionally, after the foregoing step 802 and after receiving the second network state information, according to uplink or downlink signal strength of the terminal, services, and load of a current cell and a neighboring cell, and the like, the cellular network controller may determine whether a terminal that has not accessed the cellular network or some services of the terminal are allowed to access the cellular access point of the cellular network, and whether a terminal that has accessed the cellular network or some services of the terminal are allowed to stay on the cellular network. According to a result of the determining, a list is generated in which terminals and cellular access points are in a one-to-one correspondence, where the list is called a cellular allocation list, that is, the second allocation list. The cellular allocation list includes: whether the terminal stays on or accesses the cellular network, an identifier of the terminal, an identifier of the corresponding cellular access point, and the like. Subsequently, the cellular allocation list is sent to the offload decider, and the offload decider generates an offload policy according to the first network state information and the cellular allocation list.

Optionally, after the foregoing step 801, the WLAN controller may generate an AP allocation list according to the first network state information and send the AP allocation list to the offload decider; and after the foregoing step 802, the cellular network controller may generate a cellular allocation list according to the second network state information and send the cellular allocation list to the offload decider. The offload decider generates an offload policy according to the AP allocation list and the cellular allocation list.

Figure 9:
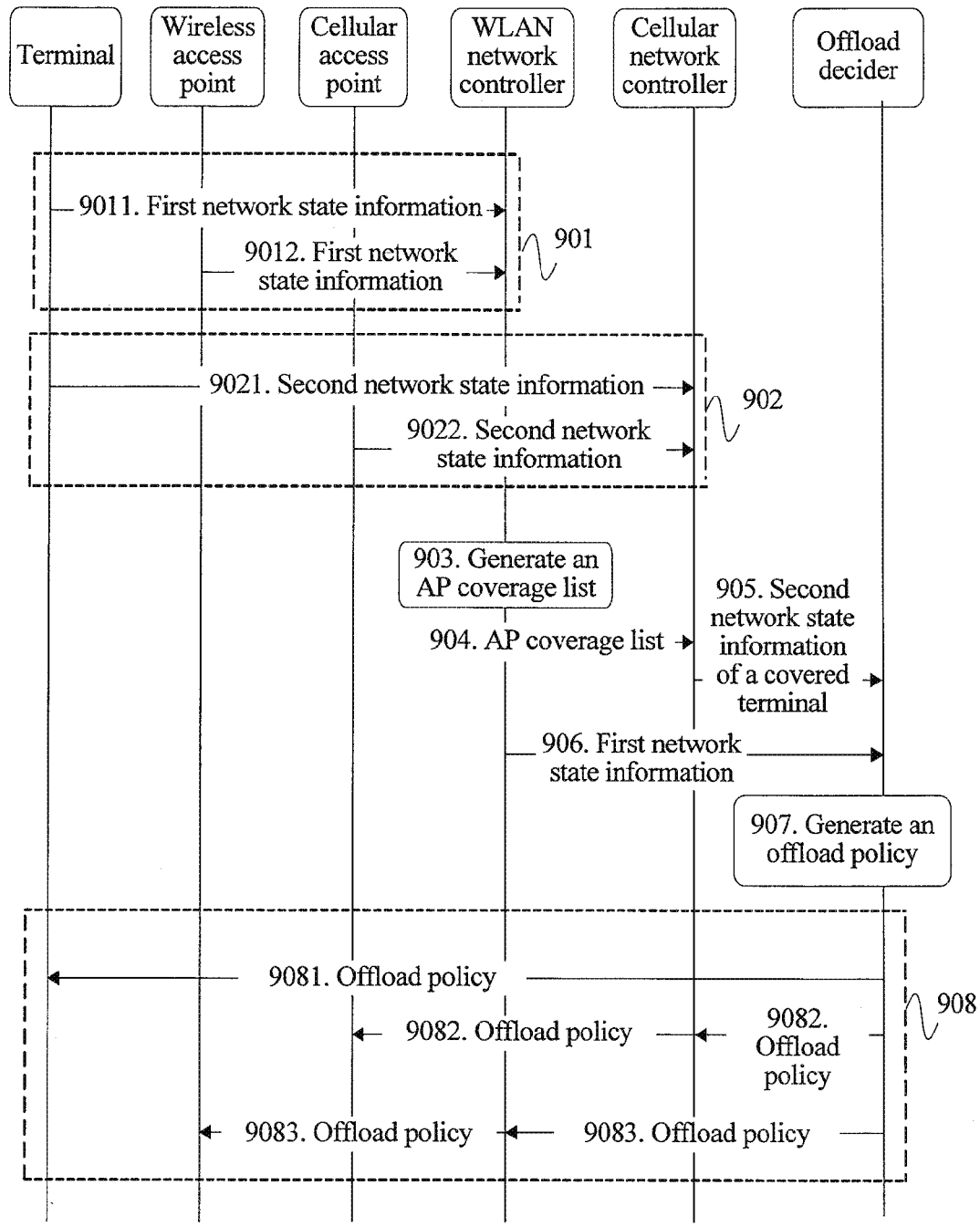
FIG. 9 is a signaling diagram of Embodiment 9 of a network offload method according to the present invention.

FIG. 9 is a signaling diagram of Embodiment 9 of a network offload method according to the present invention. In this embodiment, an offload decider receives first network state information sent by a first network controller of a first access network, and second network state information sent by a second network controller of a second access network according to a first coverage list of the first access network, where the first coverage list indicates a covered terminal that is covered by the first access network, and the second network state information is state information of the covered terminal on the second access network. The offload decider generates an offload policy for the covered terminal according to the first network state information and the second network state information that is of the covered terminal.

Referring to FIG. 9, in this embodiment, the first network controller is a WLAN controller, the first access device is an access point AP, the second access network is a cellular network, the second network controller is a cellular network controller, and the second access device is a cellular access point. Specifically, this embodiment includes the following steps:

901. A WLAN controller receives first network state information of a terminal.

Specifically, this step may include the following sub-steps:

9011. The WLAN controller receives the first network state information sent by the terminal.

9012. The WLAN controller receives the first network state information sent by an AP.

902. A cellular network controller receives second network state information of the terminal.

Specifically, this step may include the following sub-steps:

9021. The cellular network controller receives second network state information sent by the terminal.

9022. The cellular network controller receives the second network state information sent by a cellular access point.

903. The WLAN controller generates an AP coverage list.

According to the first network state information reported by the terminal or the AP, the WLAN controller generates an AP coverage list for a terminal covered by the WLAN network. The terminal covered by the WLAN network refers to a terminal that is located within coverage of the AP of the WLAN network no matter whether the terminal has accessed the network or whether an AP is allocated to the terminal.

904. The WLAN controller sends the AP coverage list to the cellular network controller.

The WLAN controller sends all or part of content of the AP coverage list to the cellular network controller, and the sent content includes at least an identifier of a terminal listed in the AP coverage list.

905. The cellular network controller sends the second network state information of the covered terminal on the cellular network to the offload decider.

906. The WLAN controller sends the first network state information to the offload decider.

The foregoing step 906 may also be performed immediately after the step 902, on which the present invention imposes no limitation.

907. The offload decider generates an offload policy.

In this step, the offload decider generates the offload policy for the terminal listed in the AP coverage list.

908. The offload decider sends the offload policy.

Specifically, this step may include the following sub-steps:

9081. The offload decider sends the offload policy to the terminal listed in the AP coverage list.

9082. The offload decider sends the offload policy to the cellular access point.

The offload decider sends the offload policy to the cellular access point via the cellular network controller.

9083. The offload decider sends the offload policy to the AP.

The offload decider sends the offload policy to the AP via the WLAN controller.

Figure 10:
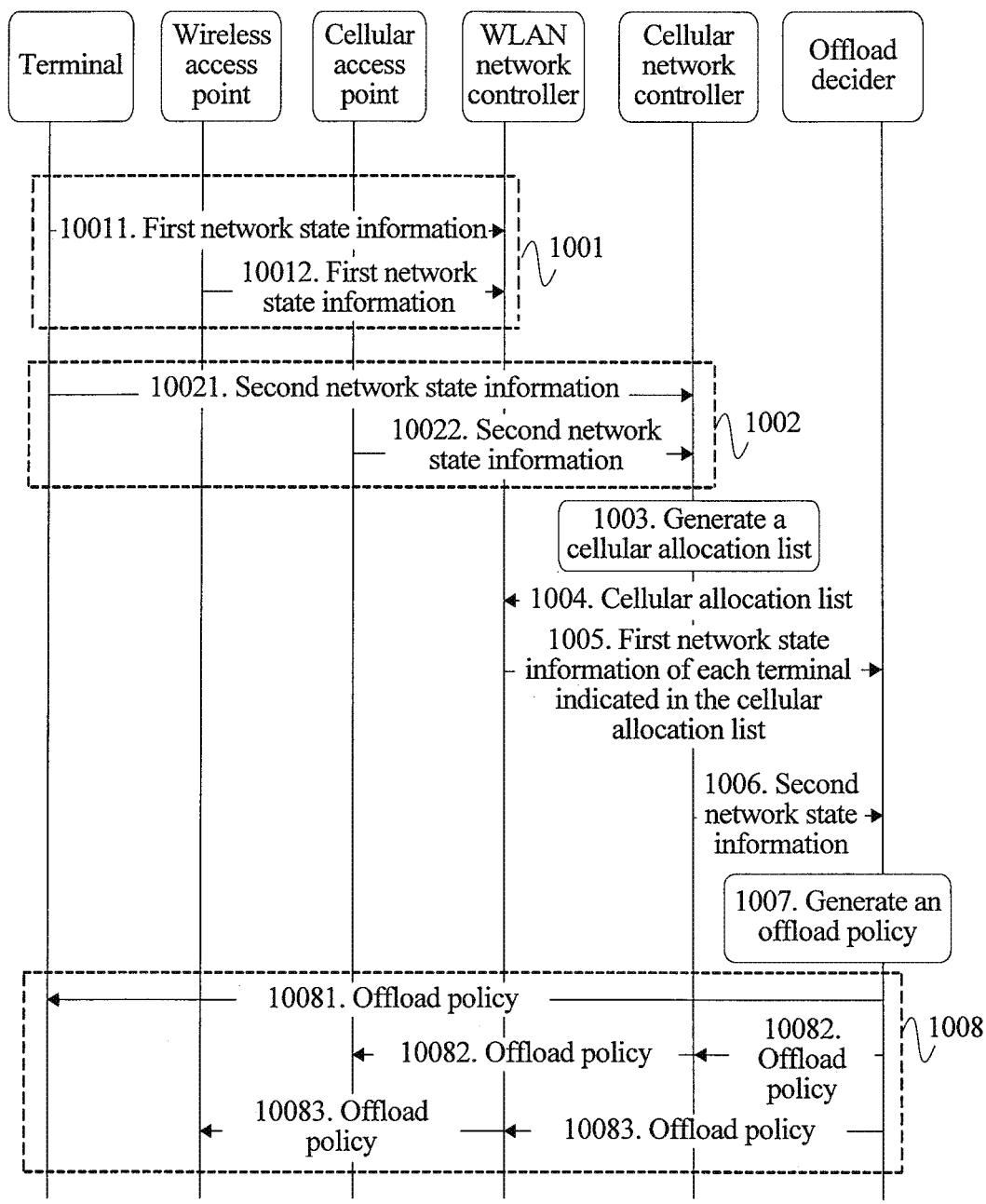
FIG. 10 is a signaling diagram of Embodiment 10 of a network offload method according to the present invention.

FIG. 10 is a signaling diagram of Embodiment 10 of a network offload method according to the present invention. In this embodiment, an offload decider receives first network state information sent by a first network controller of a first access network according to a second allocation list of a second access network, and second network state information sent by a second network controller of the second access network, where the second allocation list indicates a correspondence between each terminal and a second access device of the second access network; and according to the first network state information of each terminal indicated in the second allocation list and the second network state information, the offload decider generates an offload policy for each terminal indicated in the second allocation list.

Referring to FIG. 10, in this embodiment, the first network controller is a WLAN controller, the first access device is an access point AP, the second access network is a cellular network, the second network controller is a cellular network controller, and the second access device is a cellular access point. Specifically, this embodiment includes the following steps:

1001. A WLAN controller receives first network state information of a terminal.

Specifically, this step may include the following sub-steps:

10011. The WLAN controller receives the first network state information sent by the terminal.

10012. The WLAN controller receives the first network state information sent by an AP.

1002. A cellular network controller receives second network state information of the terminal.

Specifically, this step may include the following sub-steps:

10021. The cellular network controller receives the second network state information sent by the terminal.

10022. The cellular network controller receives the second network state information sent by a cellular access point.

1003. The cellular network controller generates a cellular allocation list.

1004. The cellular network controller sends the cellular allocation list to the WLAN controller.

The cellular network controller sends all or part of content of the cellular allocation list to the WLAN controller, and the sent content includes at least an identifier of a terminal listed in the cellular allocation list.

1005. The WLAN controller sends to an offload decider the first network state information of each terminal indicated in the cellular allocation list.

In this step, the WLAN controller sends the first network state information of only the terminal listed in the cellular allocation list to the offload decider.

1006. The cellular network controller sends the second network state information to the offload decider.

The foregoing step 1006 may also be performed immediately after the step 1002, on which the present invention imposes no limitation.

1007. According to the first network state information of each terminal indicated in the second allocation list and the second network state information, the offload decider generates an offload policy for each terminal indicated in the second allocation list.

In this step, the offload decider generates an offload policy for the terminal listed in the cellular allocation list.

1008. The offload decider sends the offload policy.

Specifically, this step may include the following substeps:

10081. The offload decider sends the offload policy to the terminal listed in the cellular allocation list.

10082. The offload decider sends the offload policy to the cellular access point.

The offload decider sends the offload policy to the cellular access point via the cellular network controller.

10083. The offload decider sends the offload policy to the AP.

The offload decider sends the offload policy to the AP via the WLAN controller.

Figure 11:
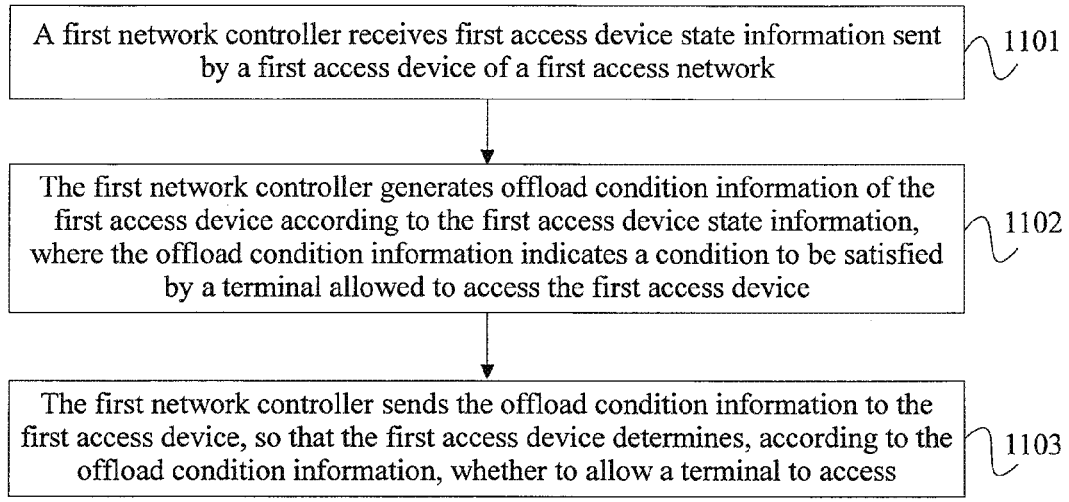
FIG. 11 is a flowchart of Embodiment 11 of a network offload method according to the present invention.

FIG. 11 is a flowchart of Embodiment 11 of a network offload method according to the present invention. This embodiment is executed by a first network controller, and is applicable to a scenario in which a network side controls an access action of a terminal when multiple access networks exist in a communications network. A difference from Embodiment 1 in FIG. 1 described above lies in that in Embodiment 1, the first network controller generates the offload policy according to the network state information of the terminal, but in this embodiment, the first network controller generates offload condition information of the first access device of the first network controller according to state information of the access device. Specifically, this embodiment includes the following steps:

1101. A first network controller receives first access device state information sent by a first access device of a first access network.

In this step, the first network controller receives the first access device state information sent by the first access device of the first access network to which the first network controller belongs. For example, the first access network is a cellular network, the first access device is a cellular access point, and the first network controller is a cellular network controller, so that the cellular network controller receives cellular access point state information, such as signal strength and transmit power of the cellular access point, sent by the cellular access point.

1102. The first network controller generates offload condition information of the first access device according to the first access device state information, where the offload condition information indicates a condition to be satisfied by a terminal allowed to access the first access device.

After receiving the first access device state information, the first network controller formulates the offload condition information of the first access device according to the information. The offload condition information indicates the condition to be satisfied by the terminal allowed to access the first access device, for example, transmit power and signal strength of the terminal allowed to access.

1103. The first network controller sends the offload condition information to the first access device, so that the first access device determines, according to the offload condition information, whether to allow a terminal to access.

In this step, the first network controller delivers the offload condition information to the first access device, so that the first access device determines, according to the offload condition information, whether to allow the terminal to access.

According to the network offload method provided in the embodiment of the present invention, a first network controller formulates offload condition information for a first access device according to received first access device state information, so that the first access device determines, according to the offload condition information, whether a terminal is allowed to access, and therefore, a network side can implement control on terminal offloading.

Figure 12:
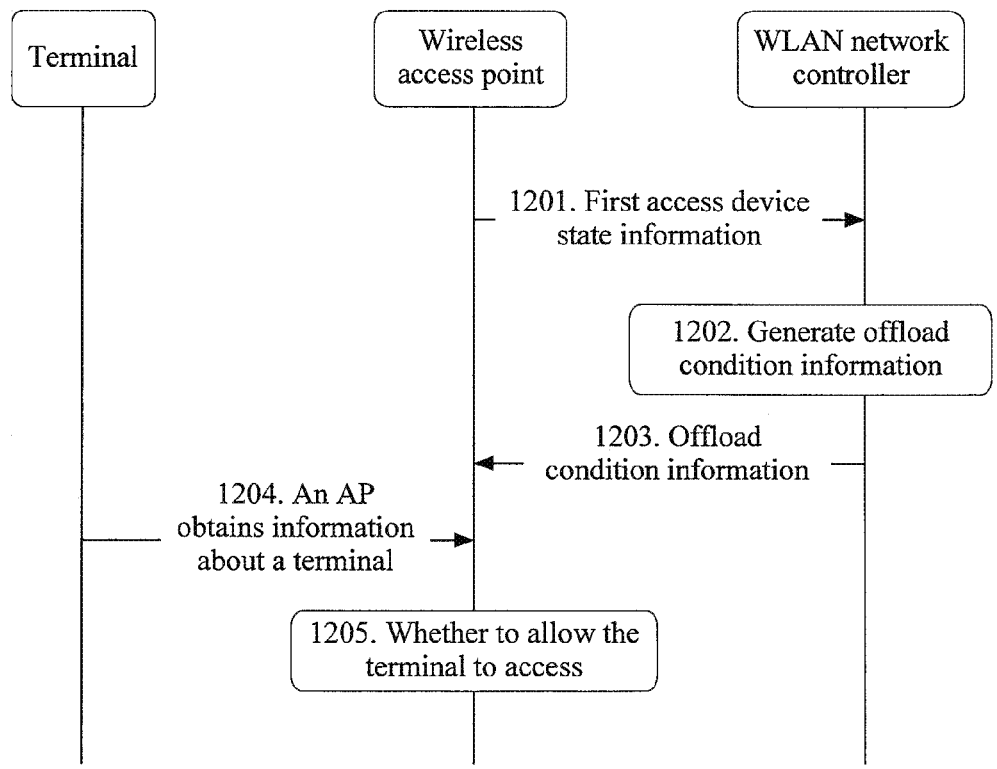
FIG. 12 is a signaling diagram of Embodiment 12 of a network offload method according to the present invention.

FIG. 12 is a signaling diagram of Embodiment 12 of a network offload method according to the present invention. In this embodiment, a first access network is specifically a WLAN network, a first access device is an AP, and a first network controller is a WLAN controller. Specifically, this embodiment includes the following steps:

1201. An access point AP sends first access device state information to a WLAN controller.

The first access device state information is related information of the AP, including load of a current AP, a quantity of correlated terminals, a quantity of active terminals, delay information, and the like; or further including related information of a neighboring AP.

1202. The WLAN controller generates offload condition information.

The WLAN controller formulates an offload condition for the current AP according to the related information of the current AP or with reference to the related information of the neighboring AP, where the offload condition includes a condition to be satisfied by a terminal accepted by the current AP, for example, signal strength.

1203. The WLAN controller sends the offload condition information to the AP.

1204. The AP obtains information about a terminal.

For example, the signal strength such as an RSSI of the terminal is obtained by receiving a probe request frame (Probe Request) sent by the terminal or by measuring.

1205. The AP determines whether to allow the terminal to access.

In this step, the AP determines, according to the offload condition information, whether to allow the terminal to access. For example, when the signal strength of the terminal satisfies a preset condition, the terminal is allowed to access; otherwise, the terminal is rejected from accessing.

It should be noted that in each embodiment described above, a process of interaction between network controllers of different access networks is involved, for example, a process of interaction between a WLAN controller and a cellular network controller. It can be understood that this process is performed in the following two manners: The network controllers of different access networks interact directly, or the network controllers of different access networks interact through a third party.

Figure 13:
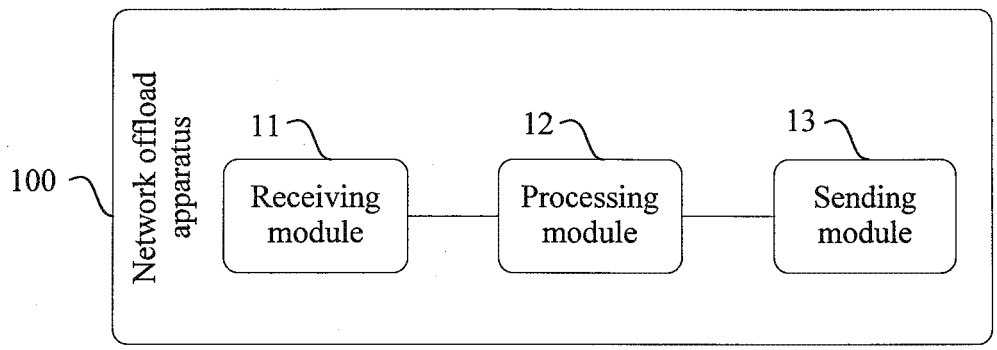
FIG. 13 is a schematic structural diagram of Embodiment 1 of a network offload apparatus according to the present invention.

FIG. 13 is a schematic structural diagram of Embodiment 1 of a network offload apparatus according to the present invention. The network offload apparatus provided in this embodiment may be configured on a network controller, or may be a network controller, and this embodiment is an apparatus embodiment corresponding to the embodiment in FIG. 1 of the present invention. The detailed implementation process is not repeatedly described herein. Specifically, the network offload apparatus 100 provided in this embodiment specifically includes:

a receiving module 11, configured to receive network state information of a terminal, where there is at least one terminal, the network state information is state information of the terminal on at least one corresponding access network, and the first network controller is a network controller of a first access network;

a processing module 12, configured to generate an offload policy for the terminal according to the network state information received by the receiving module 11; and a sending module 13, configured to send the offload policy generated by the processing module 12 to the terminal; and/or send the offload policy generated by the processing module 12 to an access device of the at least one access network.

The network offload apparatus provided in the embodiment of the present invention generates an offload policy for each terminal according to received network state information and sends the offload policy to a network-side device or the terminal, so that the network-side device or the terminal performs offload according to the offload policy, so that the network side can implement control on terminal offloading.

Further, the receiving module 11 is configured to receive first network state information of the terminal on the first access network, where the first network state information is sent by the terminal and/or a first access device of the first access network to the first network controller.

The processing module 12 is configured to generate an offload policy for the terminal according to the first network state information received by the receiving module 11.

Further, the receiving module 11 is configured to receive first network state information of the terminal on the first access network, where the first network state information is sent by the terminal and/or a first access device of the first access network to the first network controller; and a second allocation list sent by a second network controller of a second access network, where the second allocation list indicates a correspondence between each terminal and a second access device of the second access network, the second allocation list is obtained by the second network controller according to received second network state information of the terminal on the second access network, and the second network state information is sent by the terminal and/or the second access device of the second access network to the second network controller; and The processing module 12 is configured to generate an offload policy for the terminal according to the first network state information and the second allocation list that are received by the receiving module 11.

Further, the processing module 12 is further configured to generate a first allocation list according to the first network state information, where the first allocation list indicates a correspondence between each terminal and the first access device of the first access network; and generate the offload policy for the terminal according to the first allocation list and the second allocation list.

Further, the processing module 12 is further configured to generate a first allocation list according to the first network state information, where the first allocation list indicates a correspondence between each terminal and a first access device of the first access network; and The sending module 13 is further configured to send first allocation list information to a second network controller of a second access network, where the first allocation list information includes at least identification information of each terminal in the first allocation list, so that the second network controller sends second network state information of each terminal in the first allocation list to the first network controller according to the identification information of each terminal in the first allocation list; and The processing module 12 is configured to generate the offload policy for each terminal in the first allocation list information according to the second network state information of each terminal in the first allocation list information.

Further, the offload policy includes at least one type of the following information:

access network indication information, indicating information about an access network that each terminal should access;

access device indication information, indicating access device information of an access network that each terminal should access; and service indication information, indicating service information of each terminal and information about an access network that a service indicated by the service information should access.

Further, the receiving module 11 is configured to:

receive network state information sent by the terminal; or receive network state information sent by a first access device of the first access network and indicative of a state of the terminal on the first access network; or receive network state information sent by a network controller of another access network than the first access network and indicative of a state of the terminal on the another access network than the first access network.

Further, the network state information received by the receiving module 11 and sent by the terminal includes:

state information of the terminal on the first access network to which the first network controller belongs; and/or state information of the terminal on the another access network than the first access network.

In addition, based on this embodiment, the present invention further provides a network controller, including the network offload apparatus shown in FIG. 13.

Figure 14:
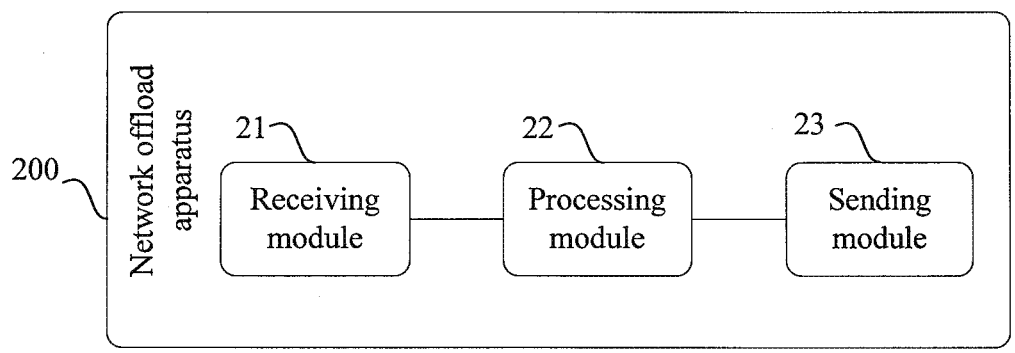
FIG. 14 is a schematic structural diagram of Embodiment 2 of a network offload apparatus according to the present invention.

FIG. 14 is a schematic structural diagram of Embodiment 2 of a network offload apparatus according to the present invention. The network offload apparatus provided in this embodiment may be configured on an offload decider, or may be an offload decider, and this embodiment is an apparatus embodiment corresponding to the embodiment in FIG. 7 of the present invention. The detailed implementation process is not repeatedly described herein. Specifically, the network offload apparatus 200 provided in this embodiment specifically includes:

a receiving module 21, configured to receive network state information of a terminal, where there is at least one terminal, and the network state information is state information of each terminal on at least one corresponding access network;

a processing module 22, configured to generate an offload policy for the terminal according to the network state information received by the receiving module 21; and a sending module 23, configured to send the offload policy generated by the processing module 22 to the terminal;

and/or send the offload policy generated by the processing module 22 to an access device of the at least one access network.

Further, the receiving module 21 is configured to receive network state information of the terminal that is sent by a network controller of each access network, where the network state information is sent by the terminal to the network controller of each access network and/or sent by an access device of each access network to a network controller corresponding to the access device; or receive network state information sent by each terminal.

Further, the receiving module 21 is configured to receive first network state information sent by a first network controller of a first access network, and second network state information sent by a second network controller of a second access network; and The processing module 22 is configured to generate the offload policy for the terminal according to the first network state information and the second network state information.

Further, the receiving module 21 is configured to receive a first allocation list generated by the first network controller according to the first network state information, where the first allocation list indicates a correspondence between each terminal and a first access device of the first access network; and The processing module 22 is configured to generate the offload policy for the terminal according to the first allocation list and the second network state information.

Further, the receiving module 21 is configured to receive a second allocation list generated by the second network controller according to the second network state information, where the second allocation list indicates a correspondence between each terminal and a second access device of the second access network; and The processing module 22 is configured to generate the offload policy for the terminal according to the second allocation list and the first network state information that are received by the receiving module 21.

Further, the receiving module 21 is configured to receive a first allocation list generated by the first network controller according to the first network state information, and a second allocation list generated by the second network controller according to the second network state information, where the first allocation list indicates a correspondence between each terminal and a first access device of the first access network, and the second allocation list indicates a correspondence between each terminal and a second access device of the second access network; and The processing module 22 is configured to generate the offload policy for the terminal according to the first allocation list and the second allocation list.

Further, the receiving module 21 is configured to receive first network state information sent by a first network controller of a first access network, and second network state information sent by a second network controller of a second access network according to a first coverage list of the first access network, where the first coverage list indicates a covered terminal that is covered by the first access network, and the second network state information is state information of the covered terminal on the second access network; and The processing module 22 is configured to generate the offload policy for the covered terminal according to the first network state information and the second network state information that is of the covered terminal.

Further, the receiving module 21 is configured to receive first network state information sent by a first network controller of a first access network according to a second allocation list of a second access network, and second network state information sent by a second network controller of the second access network, where the second allocation list indicates a correspondence between each terminal and a second access device of the second access network; and The processing module 22 is configured to generate, according to the first network state information of each terminal according to the second allocation list, and the second network state information, the offload policy for each terminal indicated by the second allocation list.

Further, the first access network is a wireless local area network WLAN, the first network controller is a WLAN controller, the first access device is an access point AP, the second access network is a cellular network, the second network controller is a cellular network controller, and the second access device is a cellular access point.

Further, the offload policy includes at least one type of the following information:

access network indication information, indicating information about an access network that each terminal should access;

access device indication information, indicating access device information of an access network that each terminal should access; and service indication information, indicating service information of each terminal and information about an access network that a service indicated by the service information should access.

In addition, based on this embodiment, the present invention further provides a network offload apparatus, including the network offload apparatus shown in FIG. 14.

Figure 15:
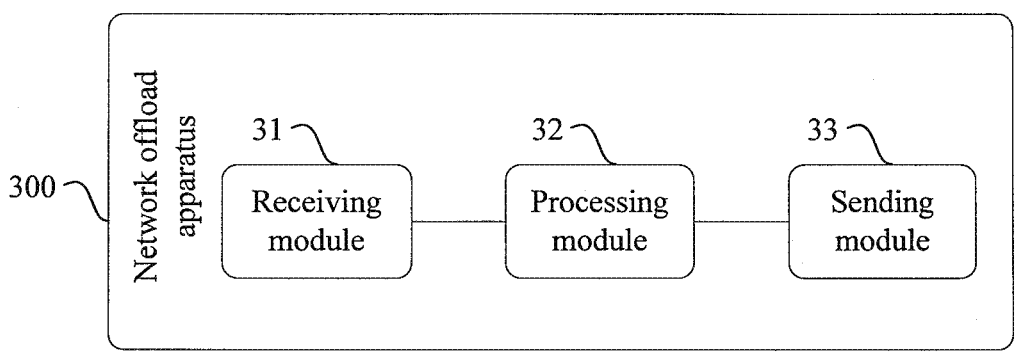
FIG. 15 is a schematic structural diagram of Embodiment 3 of a network offload apparatus according to the present invention.

FIG. 15 is a schematic structural diagram of Embodiment 3 of a network offload apparatus according to the present invention. The network offload apparatus provided in this embodiment may be configured on a network controller, or may be a network controller, and this embodiment is an apparatus embodiment corresponding to the embodiment in FIG. 11 of the present invention. The detailed implementation process is not repeatedly described herein. Specifically, the network offload apparatus 300 provided in this embodiment specifically includes:

a receiving module 31, configured to receive first access device state information sent by a first access device of a first access network;

a processing module 32, configured to generate offload condition information of the first access device according to the first access device state information received by the receiving module 31, where the offload condition information indicates a condition to be satisfied by a terminal allowed to access the first access device; and a sending module 33, configured to send the offload condition information to the first access device, so that the first access device determines, according to the offload condition information generated by the processing module 32, whether to allow a terminal to access.

In addition, based on this embodiment, the present invention further provides a network controller, including the network offload apparatus shown in FIG. 15.

Figure 16:
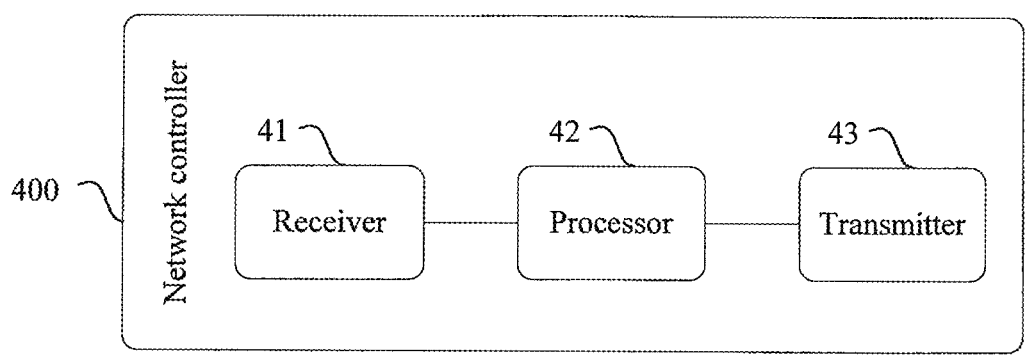
FIG. 16 is a schematic structural diagram of Embodiment 1 of a network controller according to the present invention.

FIG. 16 is a schematic structural diagram of Embodiment 1 of a network controller according to the present invention. As shown in FIG. 16, the network controller 400 provided in this embodiment includes:

a receiver 41, configured to receive network state information of a terminal, where there is at least one terminal, and the network state information is state information of the terminal on at least one corresponding access network;

a processor 42, configured to generate an offload policy for the terminal according to the network state information; and a transmitter 43, configured to send the offload policy to the terminal; and/or send the offload policy to an access device of the at least one access network.

For details such as a working process of each component of the network controller provided in this embodiment, reference may be made to the network offload apparatus shown in FIG. 13. The network controller may be used to implement the technical solution of the method embodiment shown in FIG. 1, their implementation principles are similar, and details are not repeatedly described herein.

Figure 17:
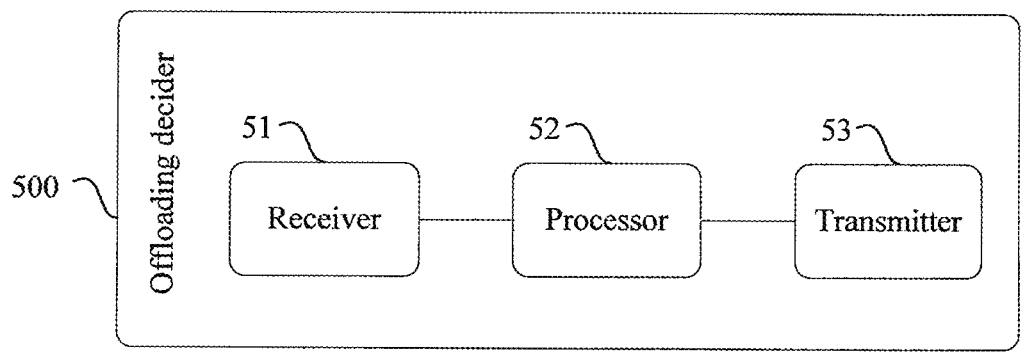
FIG. 17 is a schematic structural diagram of Embodiment 1 of an offload decider according to the present invention.

FIG. 17 is a schematic structural diagram of Embodiment 1 of an offload decider according to the present invention. As shown in FIG. 17, the offload decider 500 provided in this embodiment includes:

a receiver 51, configured to receive and/or acquire locally stored network state information of a terminal, where there is at least one terminal, and the network state information is state information of each terminal on at least one corresponding access network;

a processor 52, configured to generate an offload policy for the terminal according to the network state information; and a transmitter 53, configured to send the offload policy to the terminal; and/or send the offload policy to an access device of the at least one access network.

For details such as a working process of each component of the offload decider provided in this embodiment, reference may be made to the network offload apparatus shown in FIG. 14. The offload decider may be used to implement the technical solution of the method embodiment shown in FIG. 7, their implementation principles are similar, and details are not repeatedly described herein.

Figure 18:
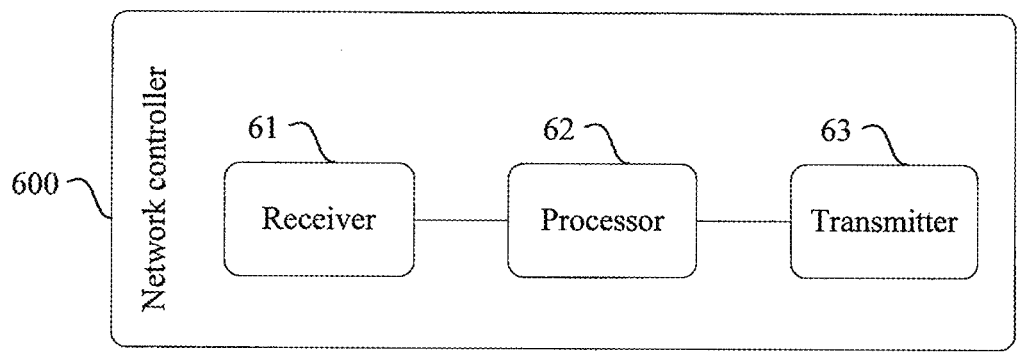
FIG. 18 is a schematic structural diagram of Embodiment 2 of a network controller according to the present invention.

FIG. 18 is a schematic structural diagram of Embodiment 2 of a network controller according to the present invention. As shown in FIG. 18, the network controller 600 provided in this embodiment includes:

a receiver 61, configured to receive first access device state information sent by a first access device of a first access network;

a processor 62, configured to generate offload condition information of the first access device according to the first access device state information, where the offload condition information indicates a condition to be satisfied by a terminal allowed to access the first access device; and a transmitter 63, configured to send the offload condition information to the first access device, so that the first access device determines, according to the offload condition information, whether to allow a terminal to access.

For details such as a working process of each component of the network controller provided in this embodiment, reference may be made to the network offload apparatus shown in FIG. 15. The network controller may be used to implement the technical solution of the method embodiment shown in FIG. 11, their implementation principles are similar, and details are not repeatedly described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A network offload method, comprising:
   receiving, by a first network controller, network state information of a terminal, the network state information is state information of the terminal on at least one corresponding access network, and the first network controller is a network controller of a first access network;
   generating, by the first network controller, an offload policy for the terminal according to the network state information; and
   sending, by the first network controller, the offload policy to at least one of the terminal and an access device of the at least one access network;
   wherein receiving the network state information of the terminal comprises:
   receiving, by the first network controller, first network state information of the terminal on the first access network, wherein the first network state information is received from at least one of the terminal and a first access device of the first access network, and
   receiving, by the first network controller, a second allocation list from a second network controller of a second access network, wherein the second allocation list indicates a correspondence between each terminal and a second access device of the second access network, the second allocation list is obtained by the second network controller according to received second network state information of the terminal on the second access network, and the second network state information is received from at least one of the terminal and the second access device of the second access network; and
   wherein generating the offload policy for the terminal according to the network state information comprises:
   generating, by the first network controller, the offload policy for the terminal according to the first network state information and the second allocation list.

2. A network offload method, comprising:
   receiving, by a first network controller, network state information of a terminal, the network state information is state information of the terminal on at least one corresponding access network, and the first network controller is a network controller of a first access network;
   generating, by the first network controller, an offload policy for the terminal according to the network state information;
   sending, by the first network controller, the offload policy to at least one of the terminal and an access device of the at least one access network;
   after receiving, by the first network controller, the network state information of the terminal, the method further comprises:

generating, by the first network controller, a first allocation list according to first network state information, wherein the first allocation list indicates a correspondence between each terminal and a first access device of the first access network, and sending, by the first network controller, first allocation list information to a second network controller of a second access network, wherein the first allocation list information comprises at least identification information of each terminal in the first allocation list, so that the second network controller sends second network state information of each terminal in the first allocation list information to the first network controller according to the identification information of each terminal in the first allocation list information; and wherein generating, by the first network controller, the offload policy for the terminal according to the network state information comprises:

generating, by the first network controller, the offload policy for each terminal in the first allocation list according to the second network state information of each terminal in the first allocation list.

3. A network offload method, comprising:

at least one of receiving and acquiring, by an offload decider, locally stored network state information of a terminal, wherein there is at least one terminal, and the network state information is state information of each terminal on at least one corresponding access network;

generating, by the offload decider, an offload policy for the terminal according to the network state information;

sending, by the offload decider, the offload policy to at least one of the terminal and an access device of the at least one access network;

wherein receiving the network state information of the terminal comprises:

receiving, by the offload decider, network state information of the terminal that is sent by a network controller of each access network, wherein the network state information is at least one of sent by the terminal to the network controller of each access network and sent by an access device of each access network to a network controller corresponding to the access device, or receiving, by the offload decider, network state information sent by each terminal;

wherein receiving, by the offload decider, the network state information of the terminal that is sent by the network controller of each access network comprises:

receiving, by the offload decider, first network state information sent by a first network controller of a first access network, and second network state information sent by a second network controller of a second access network; and wherein generating, by the offload decider, the offload policy for the terminal according to the network state information comprises:

generating, by the offload decider, the offload policy for the terminal according to the first network state information and the second network state information.

4. A network offload method, comprising:

at least one of receiving and acquiring, by an offload decider, locally stored network state information of a terminal, wherein there is at least one terminal, and the network state information is state information of each terminal on at least one corresponding access network;

generating, by the offload decider, an offload policy for the terminal according to the network state information;

sending, by the offload decider, the offload policy to at least one of the terminal and an access device of the at least one access network;

wherein receiving the network state information of the terminal comprises:

receiving, by the offload decider, network state information of the terminal that is sent by a network controller of each access network, wherein the network state information is at least one of sent by the terminal to the network controller of each access network and sent by an access device of each access network to a network controller corresponding to the access device, or receiving, by the offload decider, network state information sent by each terminal;

wherein receiving, by the offload decider, the network state information of the terminal that is sent by the network controller of each access network comprises:

receiving, by the offload decider, first network state information sent by a first network controller of a first access network, and second network state information sent by a second network controller of a second access network according to a first coverage list of the first access network, wherein the first coverage list indicates a covered terminal that is covered by the first access network, and the second network state information is state information of the covered terminal on the second access network; and wherein generating, by the offload decider, the offload policy for the terminal according to the network state information comprises:

generating the offload policy for the covered terminal according to the first network state information and the second network state information that is of the covered terminal.

5. A network offload method, comprising:

at least one of receiving and acquiring, by an offload decider, locally stored network state information of a terminal, wherein there is at least one terminal, and the network state information is state information of each terminal on at least one corresponding access network;

generating, by the offload decider, an offload policy for the terminal according to the network state information;

sending, by the offload decider, the offload policy to at least one of the terminal and an access device of the at least one access network;

wherein receiving the network state information of the terminal comprises:

receiving, by the offload decider, network state information of the terminal that is sent by a network controller of each access network, wherein the network state information is at least one of sent by the terminal to the network controller of each access network and sent by an access device of each access network to a network controller corresponding to the access device; or receiving, by the offload decider, network state information sent by each terminal;

wherein receiving, by the offload decider, the network state information of the terminal that is sent by the network controller of each access network comprises:

receiving, by the offload decider, first network state information sent by a first network controller of a first access network according to a second allocation list of a second access network, and second network state information sent by a second network controller of the second access network, wherein the second allocation list indicates a correspondence between each terminal and a second access device of the second access network; and wherein generating, by the offload decider, the offload policy for the terminal according to the network state information comprises:

generating, by the offload decider according to the first network state information of each terminal indicated by the second allocation list, and the second network state information, the offload policy for each terminal indicated by the second allocation list.

6. A network offload apparatus, comprising:

a receiving module, configured to at least one of receive and acquire locally stored network state information of a terminal, the network state information is state information of the terminal on at least one corresponding access network, and the first network controller is a network controller of a first access network;

a processing module, configured to generate an offload policy for the terminal according to the network state information received by the receiving module;

a sending module, configured to send the offload policy generated by the processing module to at least one of the terminal and an access device of the at least one access network;

wherein the receiving module is further configured to:
receive first network state information of the terminal on the first access network, wherein the first network state information is received from at least one of the terminal and a first access device of the first access network, and receive a second allocation list from a second network controller of a second access network, wherein the second allocation list indicates a correspondence between each terminal and a second access device of the second access network, the second allocation list is obtained by the second network controller according to received second network state information of the terminal on the second access network, and the second network state information is received from at least one of the terminal and the second access device of the second access network; and wherein the processing module is further configured to:
generate the offload policy for the terminal according to the first network state information and the second allocation list that are received by the receiving module.

7. A network offload apparatus, comprising:

a receiving module, configured to at least one of receive and acquire locally stored network state information of a terminal, the network state information is state information of the terminal on at least one corresponding access network, and the first network controller is a network controller of a first access network;

a processing module, configured to generate an offload policy for the terminal according to the network state information received by the receiving module;

a sending module, configured to send the offload policy generated by the processing module to at least one of the terminal and an access device of the at least one access network;

wherein the processing module is further configured to generate a first allocation list according to first network state information, wherein the first allocation list indicates a correspondence between each terminal and a first access device of the first access network;

the sending module is further configured to send first allocation list information to a second network controller of a second access network, wherein the first allocation list information comprises at least identification information of each terminal in the first allocation list, so that the second network controller sends second network state information of each terminal in the first allocation list information to the first network controller according to the identification information of each terminal in the first allocation list information; and the processing module is further configured to generate the offload policy for each terminal in the first allocation list according to the second network state information of each terminal in the first allocation list.

8. A network offload apparatus, comprising:

a receiving module, configured to at least one of receive and acquire locally stored network state information of a terminal, and the network state information is state information of each terminal on at least one corresponding access network;

a processing module, configured to generate an offload policy for the terminal according to the network state information received by the receiving module;

a sending module, configured to send the offload policy generated by the processing module to at least one of the terminal and an access device of the at least one access network;

wherein the receiving module is further configured to:
receive network state information of the terminal that is sent by a network controller of each access network, wherein the network state information is at least one of sent by the terminal to the network controller of each access network and sent by an access device of each access network to a network controller corresponding to the access device, or receive network state information sent by each terminal;

wherein the receiving module is further configured to receive first network state information sent by a first network controller of a first access network, and second network state information sent by a second network controller of a second access network; and wherein the processing module is configured to generate the offload policy for the tell final according to the first network state information and the second network state information.

9. A network offload apparatus, comprising:

a receiving module, configured to at least one of receive and acquire locally stored network state information of a terminal, and the network state information is state information of each terminal on at least one corresponding access network;

a processing module, configured to generate an offload policy for the terminal according to the network state information received by the receiving module;

a sending module, configured to send the offload policy generated by the processing module to at least one of the terminal and an access device of the at least one access network;

wherein the receiving module is configured to:
receive network state information of the terminal that is sent by a network controller of each access network, wherein the network state information is at least one of sent by the terminal to the network controller of each access network and sent by an access device of each access network to a network controller corresponding to the access device or receive network state information sent by each terminal;

wherein the receiving module is configured to receive first network state information sent by a first network controller of a first access network, and second network state information sent by a second network controller of a second access network according to a first coverage list of the first access network, wherein the first coverage list indicates a covered terminal that is covered by the first access network, and the second network state information is state information of the covered terminal on the second access network; and wherein the processing module is configured to generate the offload policy for the covered terminal according to the first network state information and the second network state information that is of the covered terminal.

10. A network offload apparatus, comprising:

a receiving module, configured to at least one of receive and acquire locally stored network state information of a terminal, and the network state information is state information of each terminal on at least one corresponding access network;

a processing module, configured to generate an offload policy for the ten iinal according to the network state information received by the receiving module;

a sending module, configured to send the offload policy generated by the processing module to at least one of the terminal and an access device of the at least one access network;

wherein the receiving module is configured to:

receive network state information of the terminal that is sent by a network controller of each access network, wherein the network state information is at least one of sent by the terminal to the network controller of each access network and sent by an access device of each access network to a network controller corresponding to the access device, or receive network state information sent by each terminal;

wherein the receiving module is configured to receive first network state information sent by a first network controller of a first access network according to a second allocation list of a second access network, and second network state information sent by a second network controller of the second access network, wherein the second allocation list indicates a correspondence between each terminal and a second access device of the second access network; and wherein the processing module is configured to generate, according to the first network state information of each terminal indicated by the second allocation list, and the second network state information, the offload policy for each terminal indicated by the second allocation list.

* * * * *